(12) United States Patent
Huang et al.

(10) Patent No.: US 10,680,782 B2
(45) Date of Patent: Jun. 9, 2020

(54) STRATEGIC MAPPING OF UPLINK RESOURCES

(71) Applicant: QUALCOMM Incorporated, San Diego, CA (US)

(72) Inventors: Yi Huang, San Diego, CA (US); Renqiu Wang, San Diego, CA (US); Hao Xu, Beijing (CN); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/975,638

(22) Filed: May 9, 2018

(65) Prior Publication Data

US 2018/0367283 A1 Dec. 20, 2018

Related U.S. Application Data

(60) Provisional application No. 62/521,347, filed on Jun. 16, 2017.

(51) Int. Cl.
*H04W 72/04* (2009.01)
*H04L 5/00* (2006.01)
(Continued)

(52) U.S. Cl.
CPC .......... *H04L 5/0055* (2013.01); *H04L 1/1812* (2013.01); *H04L 1/1861* (2013.01);
(Continued)

(58) Field of Classification Search
CPC ... H04L 5/0055; H04L 5/0094; H04L 5/0053; H04L 1/1812; H04L 1/1861; H04W 72/0406; H04W 72/14
See application file for complete search history.

(56) References Cited

U.S. PATENT DOCUMENTS 8,379,601 B2 * 2/2013 Love ..................... H04L 1/1607
370/334
8,625,509 B2 * 1/2014 Ahn ...................... H04L 5/0016
370/208
(Continued)

OTHER PUBLICATIONS

Huawei, et al., "Handling Collisions Between n+4 and n+3," 3GPP Draft; R1-1704256, 3rd Generation Partnership 3roject (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Apr. 2, 2017, XP051242408, 3 pages, Retrieved from the Internet: URL: http://www.3gpp.org/ftp/Meetings_3GPP_SYNC/RAN1/Docs/ [retrieved on Apr. 2, 2017].
(Continued)

*Primary Examiner* — Phuc H Tran
(74) *Attorney, Agent, or Firm* — Loza & Loza, LLP

(57) ABSTRACT

Aspects of the disclosure relate to implied and explicit mapping of uplink (UL) resources for acknowledgment communications from a user equipment (UE). In some examples disclosed herein, implied mapping may include indexing of information elements in a downlink (DL) communication. The explicit mapping may include information elements in the DL communication configured to explicitly provide a location of an UL resource. Other aspects, embodiments, and features are also claimed and described.

14 Claims, 14 Drawing Sheets

(51) Int. Cl.
*H04L 1/18* (2006.01)
*H04W 72/14* (2009.01)

(52) U.S. Cl.
CPC .......... *H04L 5/0053* (2013.01); *H04L 5/0094* (2013.01); *H04W 72/0406* (2013.01); *H04W 72/14* (2013.01)

(56) References Cited

U.S. PATENT DOCUMENTS

| | | | | |
|---|---|---|---|---|
| 9,083,520 | B2* | 7/2015 | Lee | H04L 1/1671 |
| 9,491,740 | B2* | 11/2016 | Yang | H04W 74/0833 |
| 10,432,441 | B2* | 10/2019 | Papasakellariou | H04L 25/023 |
| 2009/0213769 | A1* | 8/2009 | Shen | H04W 72/14 |
| | | | | 370/280 |
| 2012/0155413 | A1* | 6/2012 | Liu | H04L 1/1861 |
| | | | | 370/329 |
| 2012/0320848 | A1 | 12/2012 | Chen et al. | |
| 2016/0226645 | A1* | 8/2016 | Kim | H04L 1/1861 |
| 2017/0127394 | A1* | 5/2017 | Seo | H04L 1/1861 |
| 2017/0366328 | A1* | 12/2017 | Seo | H04L 1/0003 |
| 2018/0199367 | A1* | 7/2018 | Jung | H04L 1/1812 |
| 2018/0220400 | A1* | 8/2018 | Nogami | H04L 5/0078 |
| 2018/0220444 | A1* | 8/2018 | Lee | H04W 72/0453 |
| 2019/0230685 | A1* | 7/2019 | Park | H04L 5/00 |

OTHER PUBLICATIONS

International Search Report and Written Opinion—PCT/US2018/032148—ISA/EPO—dated Sep. 4, 2018.
NTT DOCOMO, et al., "Resource Allocation for NR PUCCH," 3GPP Draft; R1-1702813, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 7, 2017, XP051221640, 2 pages, Retrieved from the Internet: URL: http://www.3gpp.org/ftp/tsg_ran/WG1_RL1/TSGR1_88/Docs/ [retrieved on Feb. 7, 2017].
Samsung: "PUCCH HARQ-ACK Resource Mapping for DL CA," 3GPP Draft; R1-103637 PUCCH A_N Resource Indexing, 3rd Generation Partnership Project (3GPP), Mobile Competence Centre; 650, Route Des Lucioles; F-06921 Sophia-Antipolis Cedex; France, vol. RAN WG1, No. Dresden, Germany; Jun. 28, 2010, Jun. 22, 2010, XP050449095, 3 pages [retrieved on Jun. 22, 2010].

* cited by examiner

STRATEGIC MAPPING OF UPLINK RESOURCES

PRIORITY CLAIM

This application claims priority to and the benefit of provisional patent application No. 62/521,347 filed in the U.S. Patent and Trademark Office on Jun. 16, 2017, the entire content of which is incorporated herein by reference as if fully set forth below in its entirety and for all applicable purposes.

TECHNICAL FIELD

The technology discussed below relates generally to wireless communication systems, and more particularly, to techniques for sending feedback information in a wireless communication system.

INTRODUCTION

Hybrid automatic repeat request (HARQ) is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an acknowledgment (ACK) may be transmitted, whereas if not confirmed, a negative-acknowledgment (NACK) may be transmitted. In response to a NACK, the transmitting device may send a HARQ retransmission, which may implement chase combining, incremental redundancy, etc. Use of the ACK signal and the NACK signal is a practice common to many wireless communication protocols. As such, an ACK/NACK signal informs a sender of a receiver's state so that the sender is able to retransmit if needed. Hereafter, the ACK/NACK signals, as well as other similar signals described below, may be referred to as an ACK for simplicity.

In a 4G Long-Term Evolution (LTE) network, a user equipment (UE) may determine a location of an uplink wireless resource (e.g., time-frequency resource) to use for transmission of the ACK signal based on control information provided by a base station. However, the base station does not necessarily provide an explicit indication of the uplink wireless resource for the UE to transmit the ACK signal. Specifically, the downlink (DL) control information (DCI) transmitted to the UE may include a set of control channel elements (CCEs), each having a corresponding control channel element (CCE) index. These CCEs include, for example, scheduling information indicating an assignment of downlink time-frequency resources for the UE to receive data or other downlink traffic within the data region of a subframe, e.g., on a physical downlink shared channel (PDSCH). Here, the location of the uplink wireless resource to transmit the ACK corresponding to the received downlink traffic is identified based on the lowest CCE index of the physical downlink control channel (PDCCH) that included the scheduling information for the downlink traffic.

As technology continues to advance, next generation wireless communication systems, such as fifth generation (5G) new radio (NR) networks, are under development. While the considerations given above for implicit signaling of a wireless resource for a UE to use for transmission of ACK feedback are effective in LTE networks, 5G NR networks may have somewhat different considerations. Thus, there is a need in the art to provide efficient signaling of uplink resources for ACK transmissions in a 5G NR network.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to implied and explicit mapping of uplink (UL) resources for communications from a scheduled entity. In some examples disclosed herein, implied mapping may include indexing of information elements in a downlink (DL) communication. Explicit mapping may include, for example, information elements in the DL communication configured to explicitly provide a location of an UL resource.

In one aspect of the disclosure, a method of wireless communication operable at a scheduled entity is disclosed. The method includes receiving a DL transmission including a control channel element (CCE) having a CCE index, generating an acknowledgment (ACK) for transmission in response to the DL transmission, mapping the ACK to a first UL resource corresponding to the CCE index and a first parameter, and transmitting the ACK utilizing the first UL resource.

Another aspect of the disclosure provides an apparatus configured for wireless communication, having a memory device, a transceiver, and at least one processor communicatively coupled to the memory device and the transceiver, configured to: receive a DL transmission including a CCE having a CCE index, generate an ACK in response to the DL transmission, map the ACK to a first UL resource corresponding to the CCE index and a first parameter, and transmit the ACK utilizing the first UL resource.

Another aspect of the disclosure provides a method of wireless communication operable at a scheduling entity, the method including selecting a first UL resource for an ACK, the first UL resource corresponding to a first parameter and a CCE index, communicating a DL transmission including a CCE having the CCE index to a scheduled entity, and receiving an ACK communicated via the first UL resource in response to the DL transmission from the scheduled entity.

Another aspect of the disclosure provides an apparatus configured for wireless communication, including a memory device, a transceiver, and at least one processor communicatively coupled to the memory device and the transceiver, configured to: select a first UL resource for an ACK, map the first UL resource to a first parameter and a CCE index, communicate a DL transmission including a CCE having the CCE index to a scheduled entity, and receive the ACK communicated via the first UL resource in response to the DL transmission from the scheduled entity.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures.

While features of the present invention may be discussed relative to certain embodiments and figures below, all embodiments of the present invention may include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments may be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
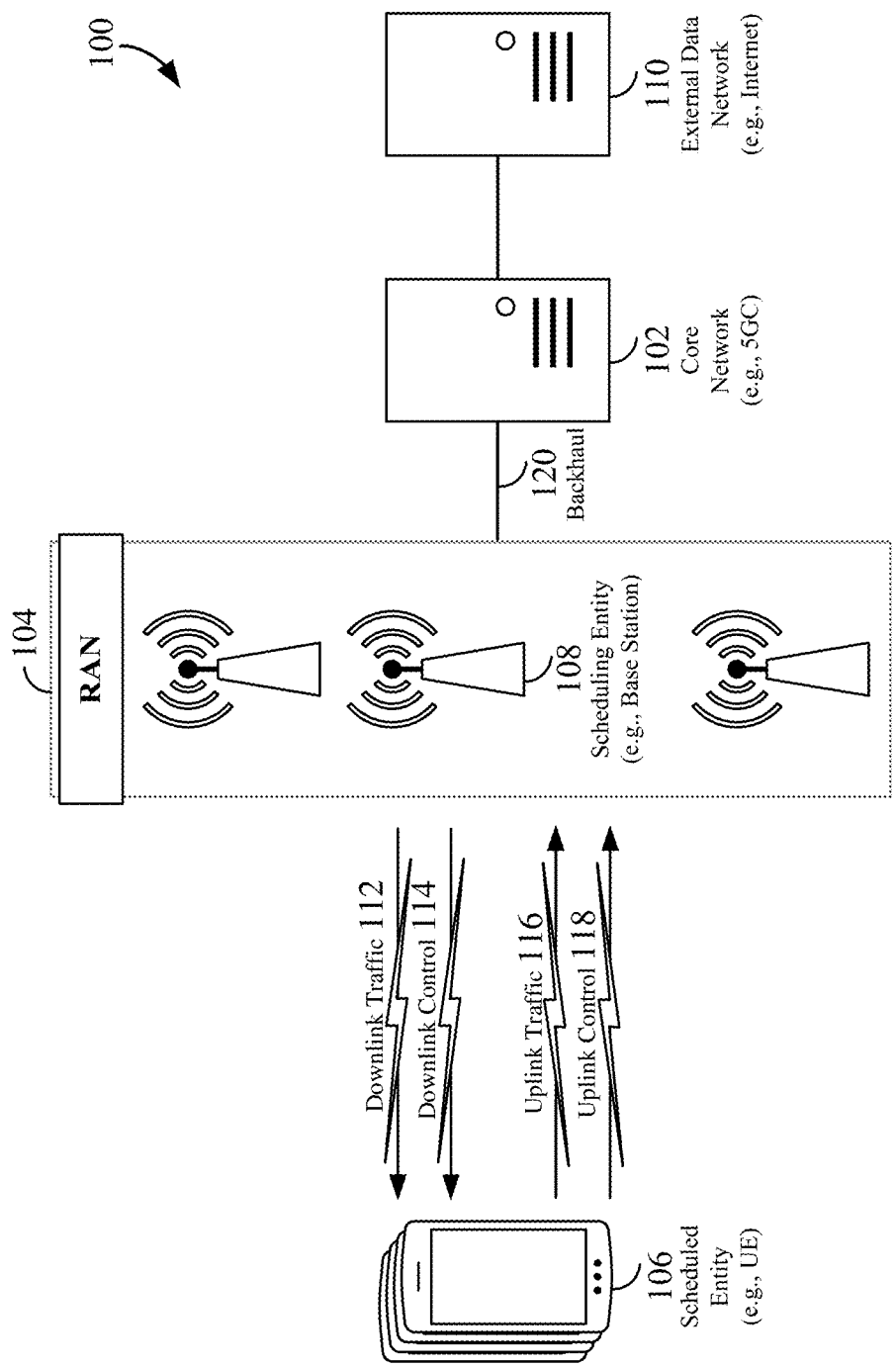
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3GPP New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a scheduled entity. In different technologies, standards, or contexts, a scheduling entity may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as a UE or scheduled entity in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. Scheduled entities may include a number of hardware structural components sized, shaped, and arranged to help in communication; such components may include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant quality of service (QoS) for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as DL transmission. In accordance with certain aspects of the present disclosure, the term downlink may refer to a point-to-multipoint transmission originating at a scheduling entity (described further below; e.g., scheduling entity 108). Another way to describe this scheme may be to use the term broadcast channel multiplexing. Transmissions from a UE (e.g., UE 106) to a base station (e.g., base station 108) may be referred to as UL transmissions. In accordance with further aspects of the present disclosure, the term uplink may refer to a point-to-point transmission originating at a scheduled entity (described further below; e.g., scheduled entity 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more UEs. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In some examples, communications between the scheduling entity 108 and one or more scheduled entities 106 may be characterized by the open systems interconnection (OSI) model which, at a basic level, may be made up of a protocol stack having a user plane and a control plane. In one example, the control plane may contain several layers, including a radio link control (RLC) layer, a medium-access control (MAC) layer, and a physical (PHY) layer, while the control plane may include a radio resource control (RRC) layer. The RLC and MAC layers may perform functions including scheduling, automatic repeat request (ARQ), and hybrid automatic repeat request (HARQ), while the PHY layer may define a means for communication of data over physical data links connecting the scheduling entity 108 and the one or more scheduled entities 106. Other layers, such as a packet data convergence protocol (PDCP) may perform functions such as header compression, integrity protection, and ciphering for the user plane and the control plane.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
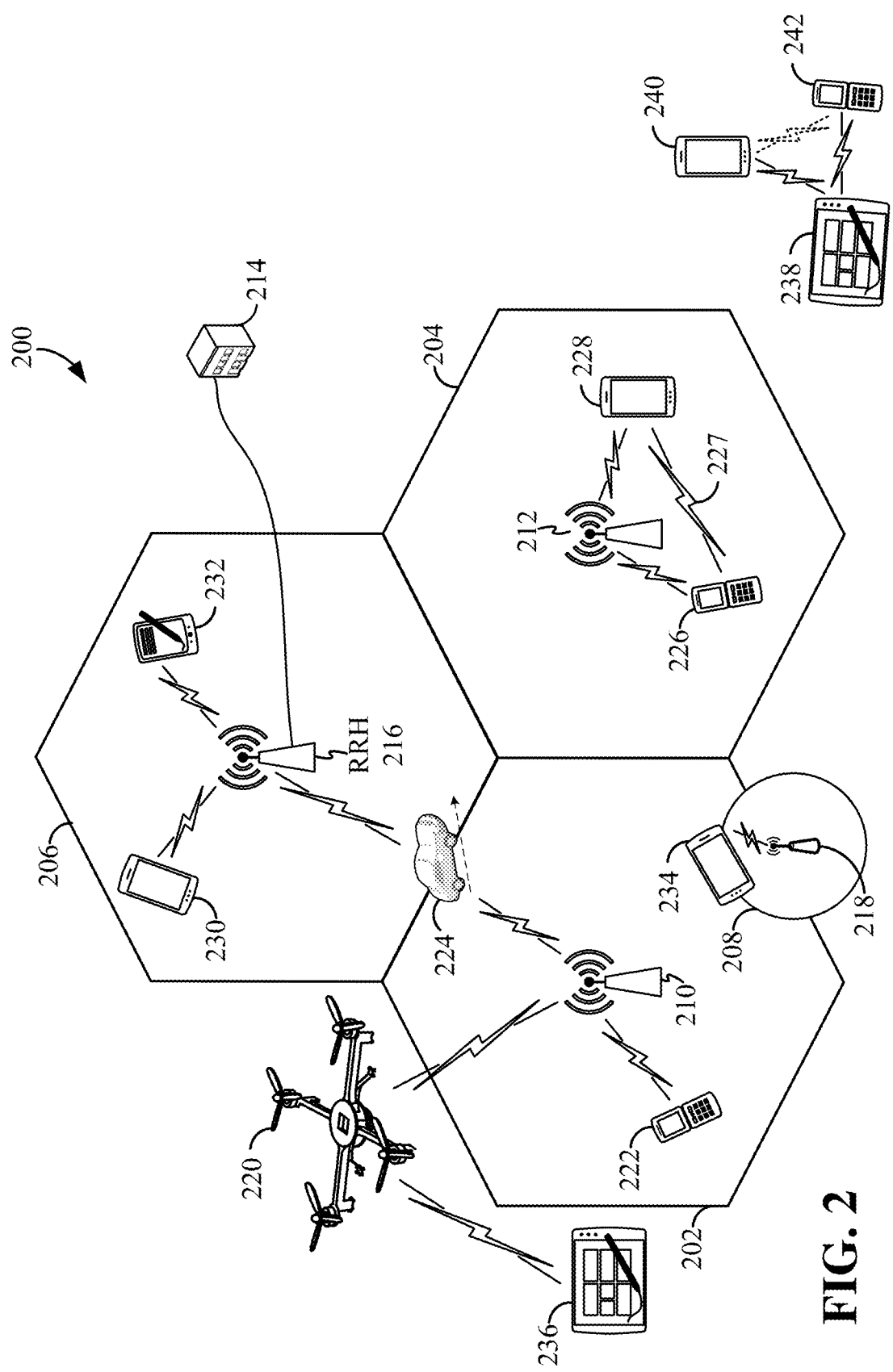
FIG. 2 is a conceptual illustration of an example of a radio access network (RAN).

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that may be uniquely identified by user equipment based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector may be identified by a single logical identification belonging to that sector. In a cell that is divided into sectors, the multiple sectors within a cell may be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station may have an integrated antenna or may be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing may be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile scheduling entity 220. In some examples, the UEs 222, 224, 226, 228, 230, 232, 234, 236, 238, 240, and/or 242 may be the same as the scheduled entity 106 described above and illustrated in FIG. 1.

In some examples, an unmanned aerial vehicle (UAV) 22, which may be a drone or quadcopter, may be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity 238 and one or more scheduled entities may communicate utilizing the scheduled resources. In some examples, the sidelink signals 227 include sidelink traffic and sidelink control. Sidelink control information may in some examples include a request signal, such as a request-to-send (RTS), a source transmit signal (STS), and/or a direction selection signal (DSS). The request signal may provide for a scheduled entity to request a duration of time to keep a sidelink channel available for a sidelink signal. Sidelink control information may further include a response signal, such as a clear-to-send (CTS) and/or a destination receive signal (DRS). The response signal may provide for the scheduled entity to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

The air interface in the radio access network 200 may utilize one or more duplexing algorithms Duplex refers to a point-to-point communication link where both endpoints may communicate with one another in both directions. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a multiple-input multiple-output (MIMO) implementation with multiple antenna ports available, a corresponding multiple number of resource grids 304 may be available for communication. The resource grid 304 is divided into multiple resource elements (REs) 306. An RE 306, which is 1 subcarrier×1 symbol, is the smallest discrete part of the time-frequency grid, and contains a single complex value representing data from a physical channel or signal. Depending on the modulation utilized in a particular implementation, each RE 306 may represent one or more bits of information. In some examples, a block of REs may be referred to as a physical resource block (PRB) or more simply a resource block (RB) 308, which contains any suitable number of consecutive subcarriers in the frequency domain. In one example, an RB 308 may include 12 subcarriers, a number independent of the numerology used. In some examples, depending on the numerology, an RB 308 may include any suitable number of consecutive OFDM symbols in the time domain. Within the present disclosure, it is assumed that a single RB 308 such as the RB 308 entirely corresponds to a single direction of communication (either transmission or reception for a given device).

A UE generally utilizes only a subset of the resource grid 304. An RB 308 may be the smallest unit of resources that may be allocated to a UE. Thus, the more RBs 308 scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 403 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., a PDSCH or a physical uplink shared channel (PUSCH)). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
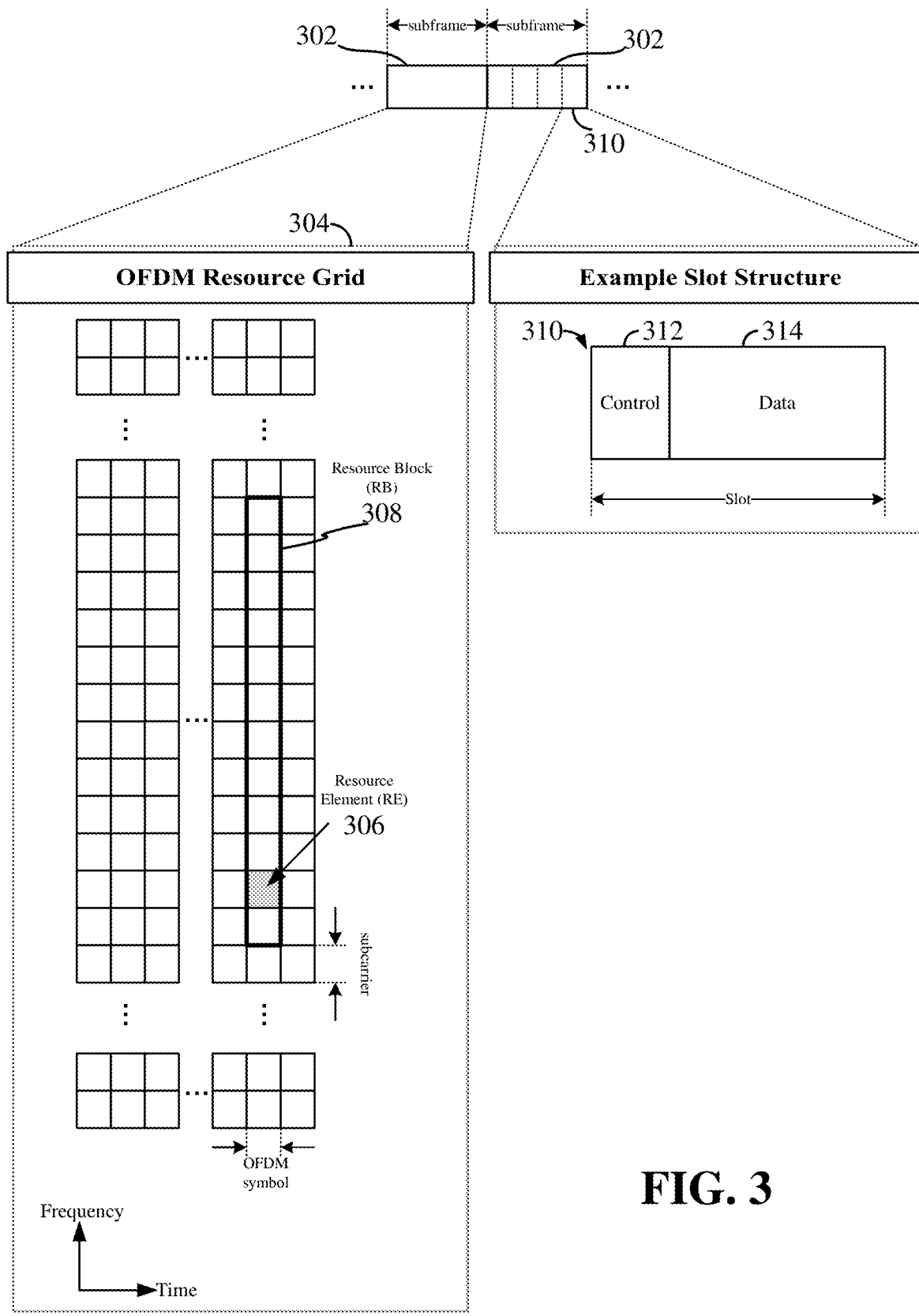
FIG. 3 is a schematic illustration of an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the base station 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a PDCCH, etc., to one or more UEs 106. The PCFICH provides information to assist a receiving device in receiving and decoding the PDCCH. The PDCCH carries a DCI including but not limited to power control commands, scheduling information, a grant, and/or an assignment of REs for DL and UL transmissions. The PHICH carries HARQ feedback transmissions such as an ACK or NACK. HARQ is a technique well-known to those of ordinary skill in the art, wherein the integrity of packet transmissions may be checked at the receiving side for accuracy, e.g., utilizing any suitable integrity checking mechanism, such as a checksum or a CRC. If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the UE 106) may utilize one or more REs 306 to carry UL control information 118 including one or more UL control channels, such as a physical uplink control channel (PUCCH), to the base station 108. UL control information may include a variety of packet types and categories, including pilots, reference signals, and information configured to enable or assist in decoding uplink data transmissions. In some examples, the control information 118 may include a scheduling request (SR), e.g., a request for the base station 108 to schedule uplink transmissions. Here, in response to the SR transmitted on the control channel 118, the base station 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH; or for an UL transmission, a PUSCH. In some examples, one or more REs 306 within the data region 314 may be configured to carry system information blocks (SIBs), carrying information that may enable access to a given cell.

The channels or carriers described above and illustrated in FIGS. 2 and 3 are not necessarily all the channels or carriers that may be utilized between a base station 108 and UEs 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
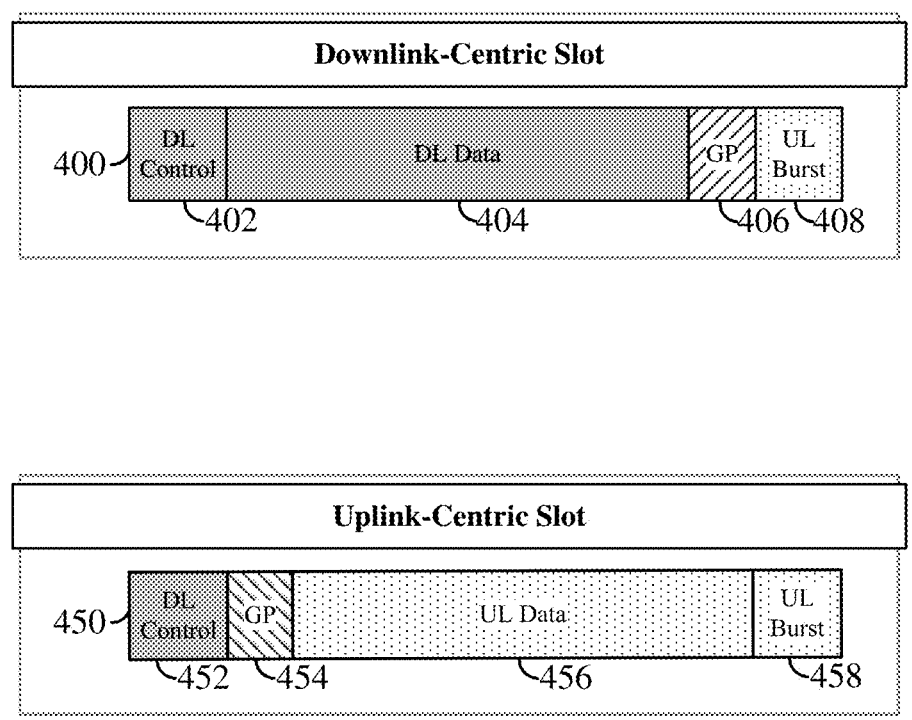
FIG. 4 is a schematic illustration of exemplary self-contained slots according to some aspects of the disclosure.

According to an aspect of the disclosure, one or more slots may be structured as self-contained slots. For example, FIG. 4 illustrates two example structures of self-contained slots 400 and 450. The self-contained slots 400 and/or 450 may be used, in some examples, in place of the slot 410 described above and illustrated in FIG. 3.

In the illustrated example, a DL-centric slot 400 may be a transmitter-scheduled slot. The nomenclature DL-centric generally refers to a structure wherein more resources are allocated for transmissions in the DL direction (e.g., transmissions from the base station 108 to the UE 106). Similarly, an UL-centric slot 450 may be a receiver-scheduled slot, wherein more resources are allocated for transmissions in the UL direction (e.g., transmissions from the UE 106 to the base station 108).

Each slot, such as the self-contained slots 400 and 450, may include transmit (Tx) and receive (Rx) portions. For example, in the DL-centric slot 400, the base station 108 first has an opportunity to transmit control information, e.g., on a PDCCH, in a DL control region 402, and then an opportunity to transmit DL user data or traffic, e.g., on a PDSCH in a DL data region 404. Following a guard period (GP) region 406 having a suitable duration 410, the base station 108 has an opportunity to receive UL data and/or UL feedback including any UL scheduling requests, CSF, a HARQ ACK/NACK, etc., in an UL burst 408 from other entities using the carrier.

For example, the slot may contain the UL burst region 408 for communicating UL data and/or UL feedback including any UL scheduling requests, CSF, a HARQ ACK/NACK, etc., with other entities in the UL direction. The UL burst region 408 may provide an opportunity for a UE 106 to transmit scheduling requests, UL user data, CSF, HARQ ACK signals, signals related to discontinuous reception/transmission (DRx/DTx), or any other suitable information to the base station 108. For simplicity, the aforementioned ACK, NACK, CSF, and DRx/DTx feedback or data may be referred to herein as an "ACK."

Here, a slot such as the DL-centric slot 400 may be referred to as a self-contained slot when all of the data carried in the data region 404 is scheduled in the control region 402 of the same slot; and further, when all of the data carried in the data region 404 is acknowledged (or at least has an opportunity to be acknowledged) in the UL burst 408 of the same slot. In this way, each self-contained slot may be considered a self-contained entity, not necessarily requiring any other slot to complete a scheduling-transmission-acknowledgment cycle for any given packet.

The GP region 406 may be included to accommodate variability in UL and DL timing. For example, latencies due to radio frequency (RF) antenna direction switching (e.g., from DL to UL) and transmission path latencies may cause the UE 106 to transmit early on the UL to match DL timing. Such early transmission may interfere with symbols received from the base station 108. Accordingly, the GP region 406 may allow an amount of time after the DL data region 404 to prevent interference, where the GP region 406 provides an appropriate amount of time for the base station 108 to switch its RF antenna direction, an appropriate amount of time for the over-the-air (OTA) transmission, and an appropriate amount of time for ACK processing by the UE 106.

Similarly, the UL-centric slot 450 may be configured as a self-contained slot. The UL-centric slot 450 is substantially similar to the DL-centric slot 400, including a guard period 454, an UL data region 456, and an UL burst region 458.

The slot structure illustrated in slots 400 and 450 is merely one example of self-contained slots. Other examples may include a common DL portion at the beginning of every slot, and a common UL portion at the end of every slot, with various differences in the structure of the slot between these respective portions. Other examples still may be provided within the scope of the present disclosure.

The DL control region 402 may occupy the first N OFDM symbols in the slot 400 and may contain one or more CCEs. In the DL control region 402, the base station 108 has an opportunity to transmit control information, e.g., on a PDCCH, to one or more UEs. The number of CCEs contained in a given PDCCH depends on configuration parameters such as bandwidth and the number of OFDM symbols in the DL control region 402. The number of CCEs in a PDCCH is referred to as an aggregation level of the PDCCH, and each PDCCH is generally sent on an aggregation of 1, 2, 4 or 8 CCEs. Here, the PDCCH may include a DCI containing UE specific scheduling assignments for DL resource allocation, power control commands, physical random access channel (PRACH) responses, scheduling information, a grant, and/or an assignment of REs for DL and UL transmissions.

Figure 5:
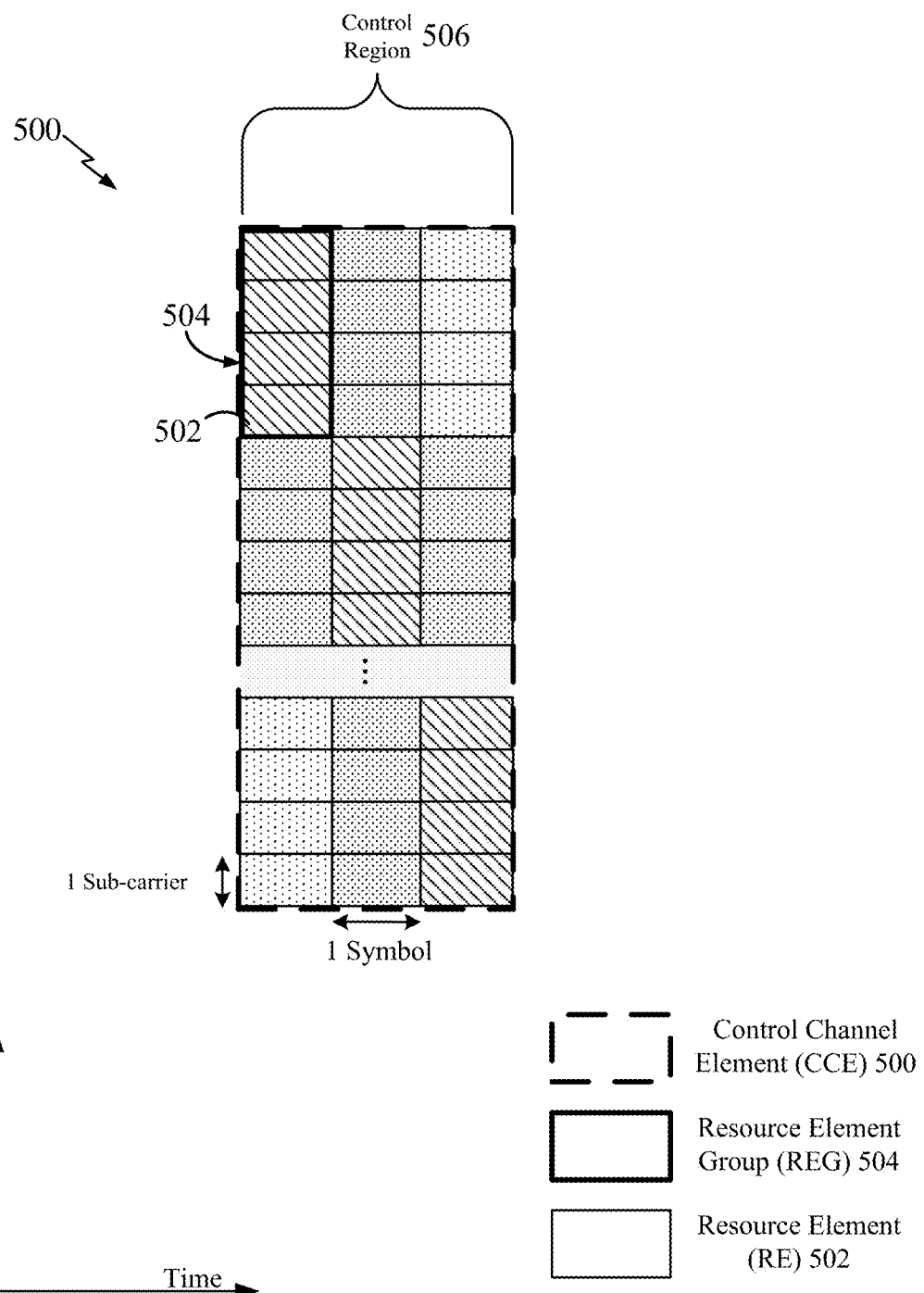
FIG. 5 is a schematic illustration of an example control channel element (CCE) according to some aspects of the disclosure.

FIG. 5 is a schematic illustration of an example CCE 500 structure in a DL control region 506 of a slot, such as any of the slots illustrated in FIGS. 3-4. The CCE 500 structure of FIG. 5 represents a portion of the DL control region 506, including a number of REs 502 that may be grouped into resource element groups (REGs) 504. Each REG 504 generally contains four consecutive REs 502 (or four REs 502 separated by a reference signal) within the same OFDM symbol and the same RB 308. In this example, the CCE structure 500 includes at least nine REGs 504 distributed across at least twelve sub-carriers and three OFDM symbols. However, as those skilled in the art will readily appreciate, the CCE 500 structure for any particular application may vary from the example described herein, depending on any number of factors. For example, the CCE 500 structure may contain any suitable number of REGs.

Figure 6:
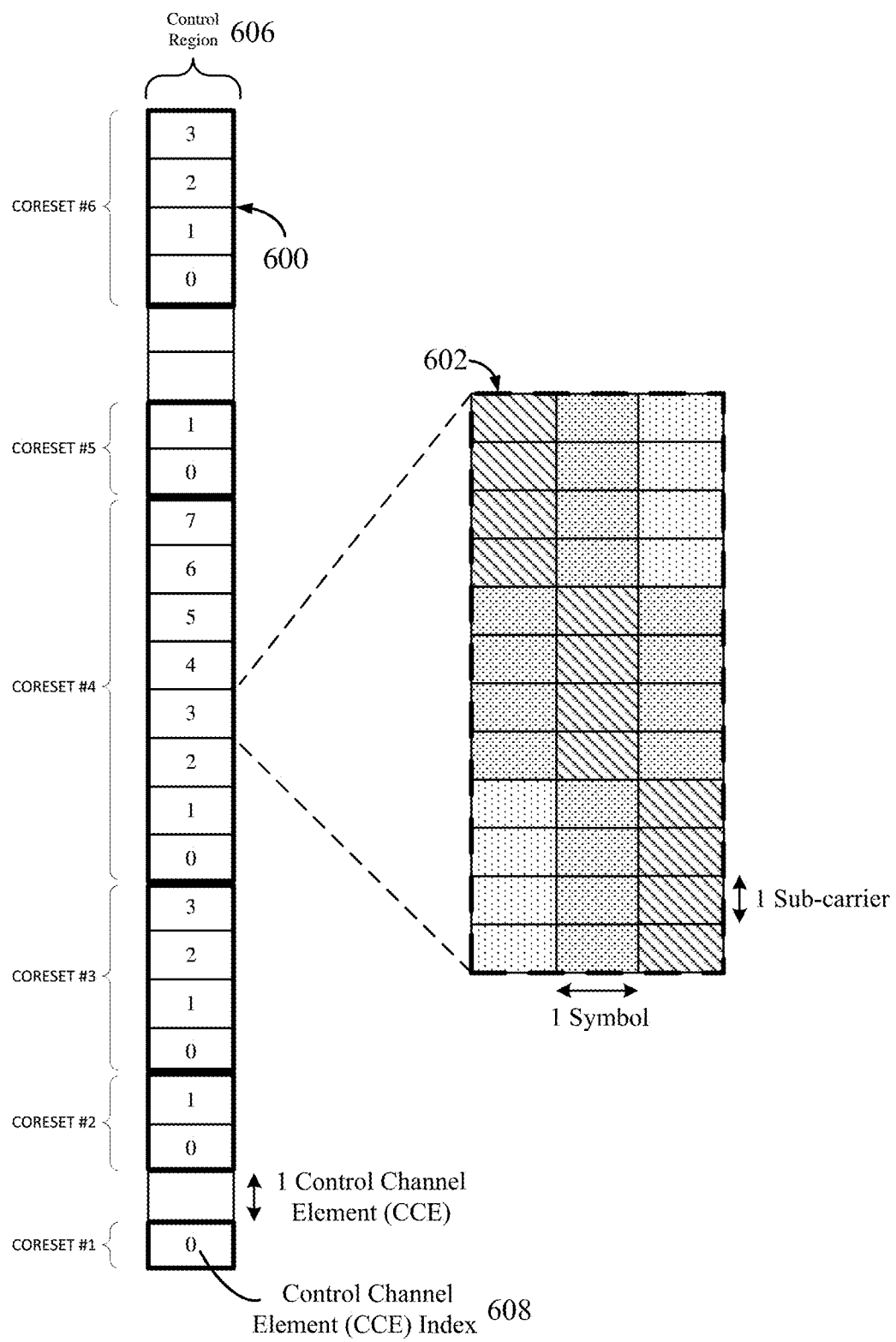
FIG. 6 is a schematic illustration of an example CCE index of a DL control region according to some aspects of the disclosure.

FIG. 6 is a schematic illustration of a number of example control-resource sets (CORESETs) 600 of a DL control region 606, such as the DL control region of any of FIGS. 3 and 4. A CORESET 600 may be configured for a UE 106 and may relate to a PDCCH for the UE 106. In LTE, a UE 106 may monitor the entire DL control region 606 for its PDCCH, but in 5G NR there may be one or more CORESETs 600 that the UE 106 is configured to monitor so that the UE 106 is not monitoring the entire DL control region 606 bandwidth. The CORESET 600 may include a bandwidth that is sized based on an amount of bandwidth of a DL transmission and/or DL channel that the scheduled entity is configured to monitor.

Each CORESET 600 represents a portion of the DL control region 606 including a number of sub-carriers in the frequency domain and one or more symbols in the time domain. In the example of FIG. 6, the CORESET 600 structure corresponds to at least one CCE 602 having dimensions in both frequency and time, sized to span across at three OFDM symbols. A CORESET having a size that spans across two or more OFDM symbols may be beneficial for use over a relatively small system bandwidth (e.g., 5 MHz). However, a one-symbol CORESET may also be possible.

As briefly discussed above, a scheduled entity, or UE 106 that utilizes HARQ generally transmits ACK information on an UL channel such as the PUSCH or PUCCH, and in some examples, during an UL burst region 408/458 of a slot. Before transmitting the ACK, however, the UE 106 identifies or determines a location (e.g., a time-frequency resource including one or more REs) within the UL channel on which to transmit the ACK. In 4G LTE networks, the UE 106 implicitly determines the location of the resource utilized for transmission of the ACK based on a PDCCH resource index. That is, the scheduling entity, or base station 108 need not necessarily provide the UE 106 with an explicit indication of the resource to use to transmit the ACK, reducing the amount of signaling overhead needed.

However, within 5G NR networks, the DL control region 606 of a given slot may be partitioned or divided, such that different UEs 106 within the same cell may have different CORESET regions to monitor for DL data. For this reason, the CCE index 608 of the PDCCH that schedules DL data for a first scheduled entity (e.g., UE 226 of FIG. 2) may be the same as the CCE index 608 of the PDCCH that schedules DL data for a second scheduled entity (e.g., UE 228 of FIG. 2). Because the location of the resource used for transmission of the ACK is mapped based on this CCE index 608, a potential for ACK collision exists. For example, UEs may be configured with different DL control resources that have the same CCE index 608, resulting in multiple UEs mapping an ACK to a common resource in the UL channel.

Furthermore, in a 5G NR network having a DL control channel that supports multi-user MIMO (MU-MIMO), the base station 108 may utilize the same time-frequency resources to send DL control information to a group of UEs. That is, by spatially precoding different streams, two or more UEs may receive their respective PDCCH information based on the same CCE index 608. Of course, the above example cases that result in ACK collisions are only some examples. That is, UL resources for different UEs may also collide for a number of other reasons. Accordingly, various aspects of the present disclosure provide for efficient and effective determination of resources for a scheduled entity (e.g., UE) to utilize for ACK transmissions that reduce or eliminate collisions with other ACK transmissions by other UEs in the same cell.

Figure 7:
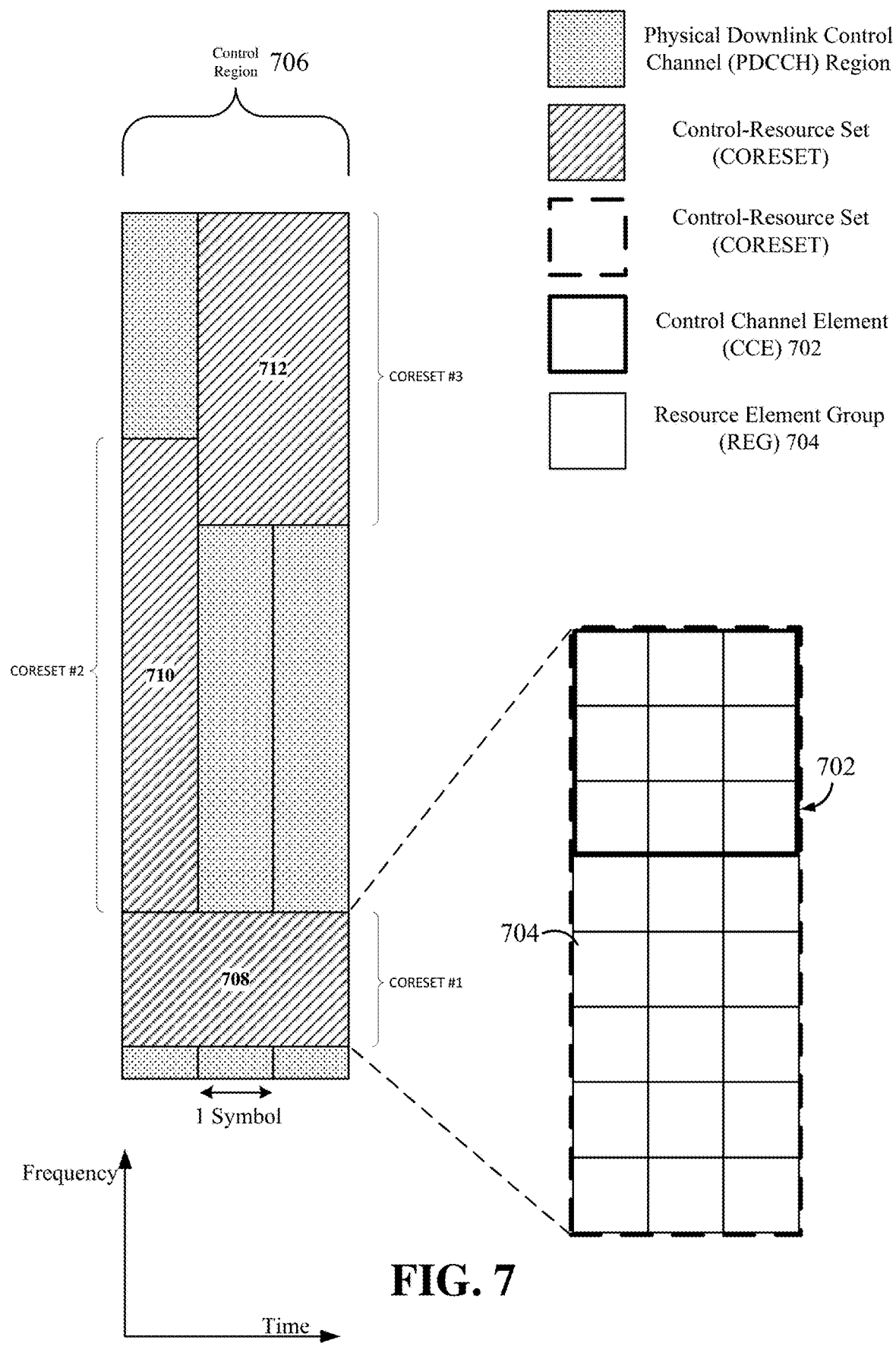
FIG. 7 is a schematic illustration of example control resource sets (CORESETs) of a downlink (DL) control region according to some aspects of the disclosure.

FIG. 7 is a schematic illustration of another example of CORESETs of a DL control region 706, such as the DL control region of any of FIGS. 3-6, according to some aspects of the disclosure. In this example, the DL control region 706 spans across three OFDM symbols. Each CORESET is illustrated within a PDCCH region of the control region 706, and allocated to a specific set of resources within the respective PDCCH regions. Each CORESET may be configured in both the time and frequency domain, and multiple CORESETs may overlap or be non-overlapping in frequency and/or time for one or more UEs 106. Each CORESET may span across one or more OFDM symbols.

A first CORESET 708 is indexed as "CORESET #1" (control resource set (CORESET) index) and is shown as occurring during three OFDM symbols in the time domain and occupying a first region of resources in the frequency domain of the DL control region 706. The first CORESET 708 may include twenty-four REGs 704 and at least one CCE 702. It should be noted that this is just one example. In another example, the first CORESET 708 may include any suitable number of REGs 704 and CCEs 702.

A second CORESET 710 is indexed as "CORESET #2" and is shown as occurring during one OFDM symbol in the time domain and occupying a second region of resources in the frequency domain. A third CORESET 712 is indexed as "CORESET #3" and is shown as occurring during two symbols in the time domain and occupying a third region of resources in the frequency domain. The second CORESET 710 and the third CORESET 712 are substantially similar to the first CORESET 708 with respect to having a composition of any suitable number of REGs and CCEs.

In one example, the number of CORESETs that correspond to a UE 106 may indicate the index associated with each CORESET. For instance, if the UE 106 is configured with the first CORESET 708, the second CORESET 710, and the third CORESET 712, then an indexing scheme may correspond to the number of CORESETs (i.e., CORESETs 1-3). In another example, a CORESET index may also correspond to a number of CORESETs available to a plurality of UEs 106, resulting a broader index range.

According to an aspect of the present disclosure, in a case where the DL control region 706 is configured to provide different CORESETs for different UEs 106 within a cell, the collision of ACK transmissions from different UEs 106 may be reduced or eliminated by utilizing a corresponding partitioning of an UL channel and assigning the partitions among the UEs 106 within a cell.

For example, the bandwidth of the UL channel may be relatively wide (e.g., 100 MHz). Accordingly, a scheduling entity (e.g., base station 212 shown in FIG. 2) may partition the UL bandwidth based on the size of the bandwidth so that different UEs 106 may utilize different regions of the bandwidth. In one example, in a case of two UEs (e.g., the first UE 226 and the second UE 228 of FIG. 2), the first UE 226 that monitors a first CORESET 708 within the DL control region 706 may utilize a first 50 MHz bandwidth of the UL channel. Similarly, a second UE 228 that monitors a second CORESET 710 within the DL control region 706 may utilize a second 50 MHz bandwidth of the UL channel. In this example, the base station 212 partitioned the 100 MHz bandwidth of the UL channel into a plurality of resource pools having two resource pools, each being 50 MHz. The partitions may include a first UL resource pool (i.e., first 50 MHz bandwidth of the UL channel) at the top of the UL channel bandwidth, and a second UL resource pool (i.e., second 50 MHz bandwidth of the UL channel) at the bottom of the UL channel bandwidth.

The base station 212 may implicitly signal a first UL resource pool for the first UE 226 to use for transmission of its ACK, based on a first CORESET index of a first CORESET 708 that the first UE 226 monitors. That is, the first CORESET index of the first UE 226 is an implicit signal that is mapped to the first UL resource pool. Thus, in response to a DL transmission received within the first CORESET 708, the first UE 226 may transmit an ACK using the first resource pool. The mapping may be known by both the base station 212 and the first UE 226. For example, the base station may determine the mapping to the first UL resource pool and communicate the mapping to the first UE 226.

Similarly, the base station 212 may implicitly signal an UL resource pool for the second UE 228 to use for transmission of its ACK, based on a second CORESET index of a second CORESET 710 that the second UE 228 monitors. That is, the second CORESET index is an implicit signal that is mapped to the second UL resource pool. In this configuration, when the base station 212 schedules the first UE 226 and the second UE 228, the base station 212 may send a DL transmission to each UE, and each UE may thereby determine a unique UL resource to utilize for transmission of an ACK in response to the DL transmission. In such a configuration, each UE has an UL resource pool that is isolated from resources used by other UEs, thereby avoiding ACK transmission collisions. The UL resource pool may correspond to one or more REs in an UL channel. For example, the UL resource pool may correspond to the UL burst region (408/458) of a slot, or a portion thereof.

According to other aspects of the present disclosure, collision of ACK transmissions from different scheduled entities (e.g., UEs 226, 228) may be reduced or avoided in the case that the DL control region 706 contains a CORESET that two or more UEs (226, 228) are configured to monitor within a cell. Moreover, even if the DL control region 706 is divided into a plurality of CORESETS, the use of separate, corresponding resource pools for transmission of the UL ACK may not eliminate collisions. For example, some networks may be configured to provide for MU-MIMO functionality for DL control signaling within the DL control region 706. In such an example, a base station 212 may transmit different streams of DL control information directed to different UEs (226, 228), which utilize the same time-frequency resource within the DL control region 706. That is, the different streams may be separated or spatially multiplexed based on precoding. In such an example, where UEs (226, 228) are configured to utilize the same CORESET, the UEs may receive a PDCCH corresponding to the same CORESET index. In such a case, mapping to a corresponding resource pool in the UL channel would result in a collision by the UEs receiving the different MU-MIMO PDCCH streams.

Accordingly, a first UE 226 may be mapped implicitly to UL channel resources based in part on additional parameters. In one example, the first UE 226 may utilize an UL resource for transmission of its ACK, where the UL resource is mapped to both: (i) an index of a first CORESET 708 monitored by the first UE 226, and (ii) an index of a CCE within the indexed first CORESET 708. That is, the first UE 226 may determine the UL resource to be used for ACK transmission in response to a DL transmission, based on implicit mapping of the CORESET index and the corresponding CCE index of the data within the indexed first CORESET 708. The first UE 226 may use a known relationship to map the CORESET index and the CCE index to a certain location and number of RBs or REs within the UL burst region 706 to use for transmission of the ACK. In this way, the base station 212 may indicate to the first UE 226 the specific UL resource for the ACK transmission via implicit signaling by the CORESET index and another implicit parameter (e.g., the CCE index contained within the indexed first CORESET 708).

In one example, the base station 212 may implicitly signal an UL resource pool for the first UE 226 to use for transmission of its ACK, based on an index of the first CORESET 708 of the first UE 226. That is, the index of the first CORESET 708 corresponding to the first UE 226 is mapped to the first UL resource pool. The base station 212 may also implicitly signal to the first UE 226 specific resources within the first UL resource pool based on an index of a CCE 702 within one or more indexed CORESETs. Similarly, the base station 212 may implicitly signal an UL resource pool for the second UE 228 to use for transmission of its ACK, based on an index of the second CORESET 710 of the second UE 228. That is, the index of the second CORESET 710 is mapped to the second UL resource pool. The base station 212 may also implicitly signal to the second UE 228 specific UL resources within the second UL resource pool based on an index of a CCE 702 within one or more indexed CORESETs. In such a configuration, each UE (226, 228) is assigned a unique UL resource pool via the index of a CORESET and the index of a CCE indexed by the CORESET index, to isolate specific UL resources from those used by other UEs, thereby avoiding ACK transmission collisions.

Figure 8:
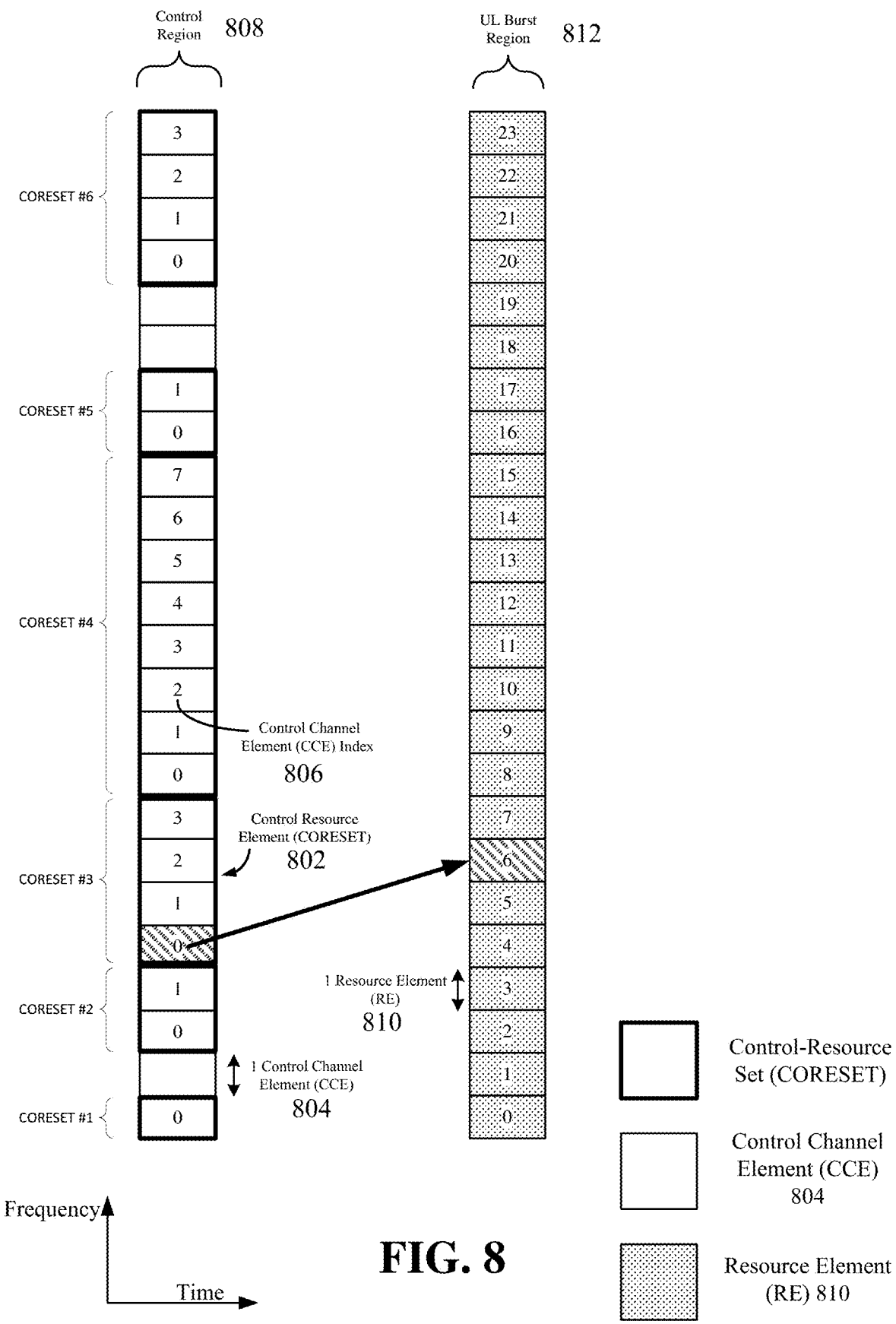
FIG. 8 is a schematic illustration of an example organization of an implicit mapping approach using additional parameters according to some aspects of the disclosure.

FIG. 8 is a schematic illustration of an example organization of an implicit mapping approach using additional parameters. The DL control region 808 contains a number of CCEs 804 spread across the frequency domain, each CCE having a CCE index 806 corresponding to a number of CCEs in a given CORESET 802. The DL control region 808 also includes a number of CORESETs 802 containing one or more of the CCEs 804. A relatively thick line indicates a scope of a given CORESET 802 and the corresponding CCEs 804. The DL control region 808 is substantially similar to the DL control regions illustrated in FIGS. 3-7.

FIG. 8 also illustrates an UL burst region 812 that contains a number of REs 810 or resource locations spread across the frequency domain, where each RE 810 is numbered based on its location. The UL burst region 812 is substantially similar to the UL burst regions (408, 458) illustrated in FIG. 4. It is noted that the DL control region 808 is illustrated as composing a sequence of CCEs 806, while the UL burst region 812 is illustrated as composing a sequence of REs 810.

In one example, the UL burst region 812 includes a partitioned region of an UL channel that is mapped to an index of the CORESET 802 (CORESET #3 in this example). One or more CCEs 804 within the CORESET 802 may be indexed. In this non-limiting example, the CCE index 806 corresponds to the number of CCEs 804 in a CORESET 802. Each CCE index 806 in FIG. 8 is illustrated as a number within a corresponding CCE 804. For example, all the CORESETs in FIG. 8 contain at least one CCE, so all the CORESETs contain a CCE indexed 0. CCEs indexed 1 are contained within CORESETs #2-6. CCEs indexed 2 and above are within CORESETs #3, 4, and 6. In this example, CORESET #3 contains a CCE indexed "0," which is mapped to RE location 7 within the UL burst region 812. In other words, the index of the CORESET #2 may provide an implicit mapping to the UL burst region 812, which in this example is a partitioned resource pool of the UL channel. The CCE index further prunes the partitioned resource and provides implicit mapping to an RE numbered "6" within the partitioned resource pool. It should be noted that this is just one example. In another embodiment, the CCE index 806 may provide mapping to the partitioned resource pool, and the CORESET index may provide mapping to a specific location within the partitioned resource pool.

In another example, the UL burst region 812 corresponds to the entire UL channel, and not necessarily a partitioned region of the UL channel. In this example, a parameter specific to the first UE 226 may be used to map UL data to an UL resource. For instance, during an initial connection procedure between the first UE 226 and a base station 212, the first UE 226 may be assigned a cell radio network temporary identifier (C-RNTI) to identify the first UE 226 during an exchange of information. The C-RNTI may be assigned during the setup of the RRC Connection between the first UE 226 and the base station 212. Thus, the parameter specific to the first UE 226 may include the C-RNTI. Another parameter including information specific to the first UE 226 may include a scrambling identification (SCID) used for DMRS generation with MU-MIMO. Using one or more of these parameters, a specific UL resource may be identified to the first UE 226 according to a known mapping between the parameter and one or more REs 810 or resource locations of the UL burst region 812. By making the mapping of the UL resources based on one or more of the CCE index and/or the CORESET index, as well as the parameters specific to a UE (such as SCID and/or C-RNTI), a unique mapping arrangement for each UE may be provided to determine a specific UL resource to use for transmission of an ACK.

Figure 9:
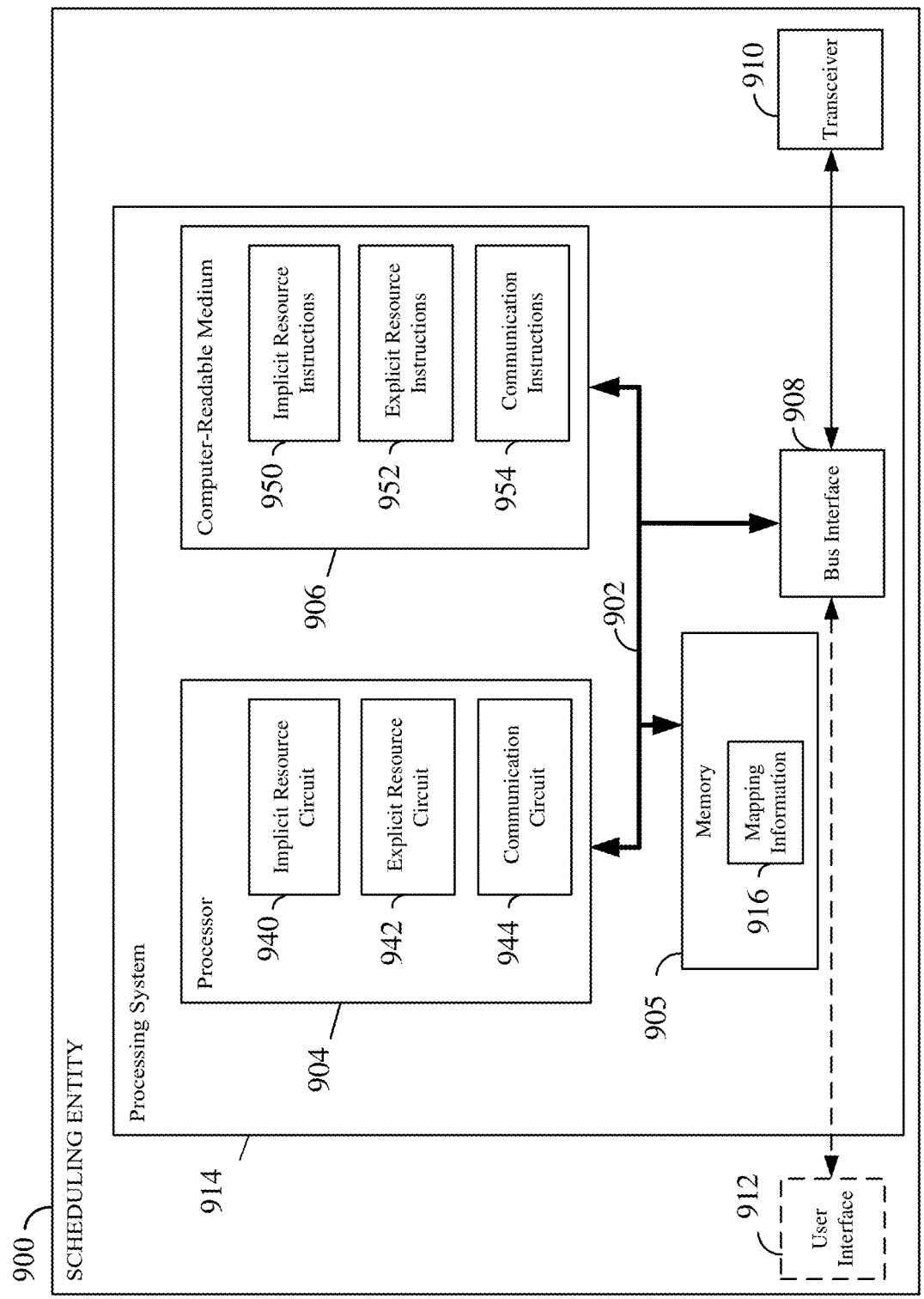
FIG. 9 is a block diagram conceptually illustrating an example of a hardware implementation for a scheduling entity according to some aspects of the disclosure.

FIG. 9 is a block diagram illustrating an example of a hardware implementation for a scheduling entity 900 employing a processing system 914. For example, the scheduling entity 900 may be a UE as illustrated in any one or more of FIGS. 1 and/or 2. In another example, the scheduling entity 900 may be a base station as illustrated in any one or more of FIGS. 1 and/or 2.

The scheduling entity 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 900 may be configured to perform any one or more of the functions described herein. That is, the processor 904, as utilized in a scheduling entity 900, may be used to implement any one or more of the processes and procedures described below and illustrated in FIGS. 11-14.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a communication interface or means for communicating with various other apparatus over a transmission medium. Depending upon the nature of the apparatus, a user interface 912 (e.g., keypad, display, speaker, microphone, joystick) may also be provided. Of course, such a user interface 912 is optional, and may be omitted in some examples, such as a scheduling entity.

In some aspects of the disclosure, the processor 904 may include an implicit resource circuit 940 configured for various functions, including, for example, generating and assigning resources of an UL channel to a scheduled entity. For example, the implicit resource circuit 940 may be configured to implement one or more of the functions described below in relation to FIGS. 11-14.

For example, the implicit resource circuit 940 may be configured to partition an UL channel into a number of partitions, and generate a mapping of a first parameter (e.g., a CORESET index) or CCE index 906, or both, to each of the partitioned regions of the UL channel. In another example, the mapping may be a one-to-one mapping of the first parameter and the CCE index to a respective one of a partitioned region and a resource within the partitioned region. The implicit resource circuit 940 may partition the UL channel to generate one or more partitioned UL resource regions. For example, the processing system 914 may partition the UL channel, including PUCCH or PUSCH bandwidths, into resource pools configured to be assigned or otherwise provided to a scheduled entity for an UL communication. Here, a portion of the UL channel bandwidth, or even the partitioned portion of the UL channel may correspond to the UL burst region illustrated in FIGS. 4 and 8.

In one implementation, the scheduling entity 900 may determine how many scheduled entities are utilizing the UL channel and partition the UL channel based on the number of scheduled entities. For example, if six scheduled entities are utilizing a common UL channel, then the scheduling entity 900 may partition the UL channel into six resource pools. In this way, each of the six scheduled entities may be assigned a different one of the six resource pools. In this example, each scheduled entity may be assigned to an equally sized resource pool. In another implementation, the scheduling entity 900 may assign multiple scheduled entities to a single resource pool. In this implementation, the scheduling entity 900 may also determine a specific portion of the resource pool to assign to each scheduling entity to prevent collision of UL communications. For example, the specific portion of the resource pool may be indicated to each scheduled entity using the first parameter, or any other suitable parameters described herein.

The implicit resource circuit 940 may map a first UL resource to a first parameter and a CCE index, and record mapping information 916 in a memory 905. For example, the scheduling entity 900 may generate a mapping that identifies a relationship between the first parameter and a resource pool of the UL channel. The scheduling entity 900 may also generate a mapping between the CCE index and the first UL resource within the resource pool. The first parameter may include a CORESET index of a CORESET 902 that the scheduled entity is configured to monitor, where the CORESET 902 contains the indexed CCE received by the scheduled entity. In this way, each of the CORESET index associated with the scheduled entity and the indexed CCE within the CORESET 902 associated with a DL transmission may be mapped to a respective one of the resource pool or the location within the resource pool for the scheduled entity to use for an UL transmission. Any mapping information 916 generated by the scheduling entity 900 may be stored in the memory 905.

In another implementation, the first parameter may correspond to a parameter specific to the scheduled entity. Here, the resource pool and/or a specific location within the resource pool may be indicated by the RNTI and/or the SCID associated with a DL transmission to the scheduled entity. For example, the scheduling entity 900 may generate a mapping between one or more of the RNTI or SCID associated with the scheduled entity, store the mapping information 916 in the memory 905, and communicate the mapping information 916 to the scheduled entity. Thereafter, the scheduling entity 900 may communicate a DL transmission having one or more of the RNTI or SCID associated with the scheduled entity. Upon receipt of the DL transmission, the scheduled entity may determine a mapping between the resource pool and/or the specific location within the resource pool, and one or more of the RNTI the SCID, based on the mapping information 916 provided by the scheduling entity 900.

The scheduling entity 900 may communicate a DL transmission including the first parameter and the CCE index via the transceiver 910. Similarly, the scheduling entity 900 may receive an ACK communicated via the first UL resource in response to the DL transmission. For example, the scheduling entity 900 may receive the ACK via an UL RE of the UL resource pool based on the mapping of the first parameter and the CCE index.

Collision of UL communications from different scheduled entities may be reduced or eliminated by distinguishing different scheduled entities using the implicit mapping based not only on parameters specific to the scheduled entity, but also based on an additional information elements. In one example, the explicit resource circuit 942 generates an explicit signal, or an explicit information element, that may be carried in a DCI in a DL transmission between a scheduling entity 900 and a scheduled entity. In another example, the explicit signal may be included in an ACK grant communicated by the scheduling entity 900 to the scheduled entity. The explicit signal may be any suitable number of bits, occupying any suitable number of resource blocks or resource elements in the DL transmission. In one example, the explicit signal may include a number of bits that indicate an amount of offset to be applied to a first UL resource determined via implicit mapping. Accordingly, the scheduling entity 900 may communicate the explicit signal to one or more scheduled entities instructing the scheduled entities to apply an amount of offset corresponding to the number of bits in the explicit signal. The scheduled entities may receive mapping information 1016 including the explicit signal, and determine the amount of offset that corresponds to the number of bits using a look-up table generated by the explicit resource circuit 942 and stored in the memory 905.

For example, the scheduling entity 900 may communicate a two-bit explicit signal to the scheduled entity via the transceiver on a DL transmission. The scheduled entity may receive the two-bit signal and determine an amount of offset to apply to a first UL resource, where the first UL resource was determined by the implicit resource circuit 940 and/or implicit resource instructions 952. The scheduled entity may determine the amount of offset by using the stored look-up table that maps the two-bit signal with a corresponding amount of offset. The first UL resource may have been previously determined through implicit mapping, via a previous DL transmission. The scheduled entity may then apply the determined amount of offset to the first UL resource to generate a modified UL resource, or a second UL resource, for transmitting an ACK in response to the previous DL transmission.

Using the two-bit explicit signal as an example, the explicit resource circuit 942 may generate a look-up table that will include combinations of signaling that may each be mapped to an amount of offset. The two bits of the explicit signal may be represented as a number of resource blocks (RBs) 308 or any other combination of REs and/or resources. For example, if the scheduling entity 900 communicates bits 01 to the scheduled entity, the scheduling entity 900 is directing the scheduled entity to offset the first UL resource by 10 RB, or ten resource blocks. In another example, the two bits of the explicit signal may be represented as resource elements or, alternatively, as an offset in one or more of a frequency domain, a space domain, a time domain, a code domain, or a cyclic shift domain.

The explicit resource circuit 942 of the scheduling entity 900 may configure the amount of offset that corresponds to a given explicit signal based on any suitable parameters. In one example, the scheduling entity 900 may transmit a look-up table containing a mapping between a number of bits in the explicit signal and an amount of offset to be applied to an UL resource determined by implicit mapping. The look-up table may be communicated between the scheduling entity 900 and the scheduled entity utilizing any higher layer communication protocol, such as RRC signaling. The scheduling entity 900 and the scheduled entity may maintain the look-up table (part of the mapping information 916) in a respective memory portion on each device (e.g., memory 905). In this way, there is a known relationship of a mapping between the number of bits in the explicit signal and the amount of offset to be applied to the first UL resource.

In another implementation, the explicit resource circuit 942 may generate an explicit signal that includes an override command. For example, the explicit signal may be configured to override the implicit mapping to an UL resource by providing an address or index to another UL resource over which the scheduled entity may transmit an UL communication.

The processor 904 may further include communication circuitry 944. The communication circuitry 944 may include one or more hardware components that provide the physical structure that performs various processes related to wireless communication (e.g., signal reception, signal generation, and/or signal transmission) as described herein.

The processor 904 is responsible for managing the bus 902 and general processing, including the execution of software stored on the computer-readable medium 906. The software, when executed by the processor 904, causes the processing system 914 to perform the various functions described herein for any particular apparatus. The computer-readable medium 906 and the memory 905 may also be used for storing mapping information 916 and other data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 906 may include software containing implicit resource instructions 952 configured for various functions, including, for example, partitioning an UL channel, determining an implicit mapping arrangement between resources of the UL channel and certain parameters, and communicating the implicit mapping arrangement to a scheduled entity. For example, the software containing implicit resource instructions 952 may be configured to implement one or more of the functions described below in relation to FIGS. 11-14.

In one or more examples, the computer-readable storage medium 906 may include software containing explicit resource instructions 954 configured for various functions, including, for example, scheduling a DL transmission and an UL communication in response to the DL transmission, and generating a message containing an explicit mapping arrangement to a scheduled entity. For example, the software containing explicit resource instructions 954 may be configured to implement one or more of the functions described below in relation to FIGS. 11-14.

In one or more examples, the computer-readable medium 906 may include communication instructions 954. The communication instructions 954 may include one or more software instructions that, when executed, provide the means to perform various processes related to wireless communication (e.g., signal reception, signal generation, and/or signal transmission) as described herein.

In one configuration, the scheduling entity 900 is an apparatus configured for wireless communication, and includes means for selecting a first UL resource for an ACK, the first UL resource corresponding to a first parameter and a CCE index. In one aspect, the aforementioned means may be the processing system 914. In another aspect, the aforementioned means may include the processor 904 and corresponding implicit resource circuit 940 and explicit resource circuit 942. In another aspect, the aforementioned means may include the computer readable medium 906 and the corresponding implicit resource instructions 952 and explicit resource instructions 954. In another aspect, the aforementioned means may be a circuit or any apparatus configured to perform the functions recited by the aforementioned means.

In another configuration, the scheduling entity 900 includes means for communicating a DL transmission including a CCE having the CCE index to a scheduled entity. In one aspect, the aforementioned means may include one or more of the transceiver 910, the bus interface 908, and the processing system 914. In another aspect, the aforementioned means may be a circuit or any apparatus configured to perform the functions recited by the aforementioned means.

In another configuration, the scheduling entity 900 includes means for receiving an ACK communicated via the first UL resource in response to the DL transmission from the scheduled entity. In one aspect, the aforementioned means may include one or more of the transceiver 910, the bus interface 908, and the processing system 914. In another aspect, the aforementioned means may be a circuit or any apparatus configured to perform the functions recited by the aforementioned means.

In another configuration, the scheduling entity 900 includes means for mapping a first UL resource to a CCE index. In one aspect, the aforementioned means may be the processing system 914. In another aspect, the aforementioned means may include the processor 904 and corresponding implicit resource circuit 940 and explicit resource circuit 942. In another aspect, the aforementioned means may include the computer readable medium 906 and the corresponding implicit resource instructions 952 and explicit resource instructions 954. In another aspect, the aforementioned means may be a circuit or any apparatus configured to perform the functions recited by the aforementioned means.

In another configuration, the scheduling entity 900 includes means for communicating a first DL transmission including the CCE index. In one aspect, the aforementioned means may include one or more of the transceiver 910, the bus interface 908, and the processing system 914. In another aspect, the aforementioned means may be a circuit or any apparatus configured to perform the functions recited by the aforementioned means.

In another configuration, the scheduling entity 900 includes means for communicating a second DL transmission including an explicit signal indicative of a second UL resource. In one aspect, the aforementioned means may include one or more of the transceiver 910, the bus interface 908, and the processing system 914. In another aspect, the aforementioned means may be a circuit or any apparatus configured to perform the functions recited by the aforementioned means.

In another configuration, the scheduling entity 900 includes means for receiving an ACK communicated via the second UL resource in response to the first DL transmission. In one aspect, the aforementioned means may include one or more of the transceiver 910, the bus interface 908, and the processing system 914. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1, 2, 9, and/or 10, and utilizing, for example, the processes and/or algorithms described herein in relation to FIGS. 11-14.

Figure 10:
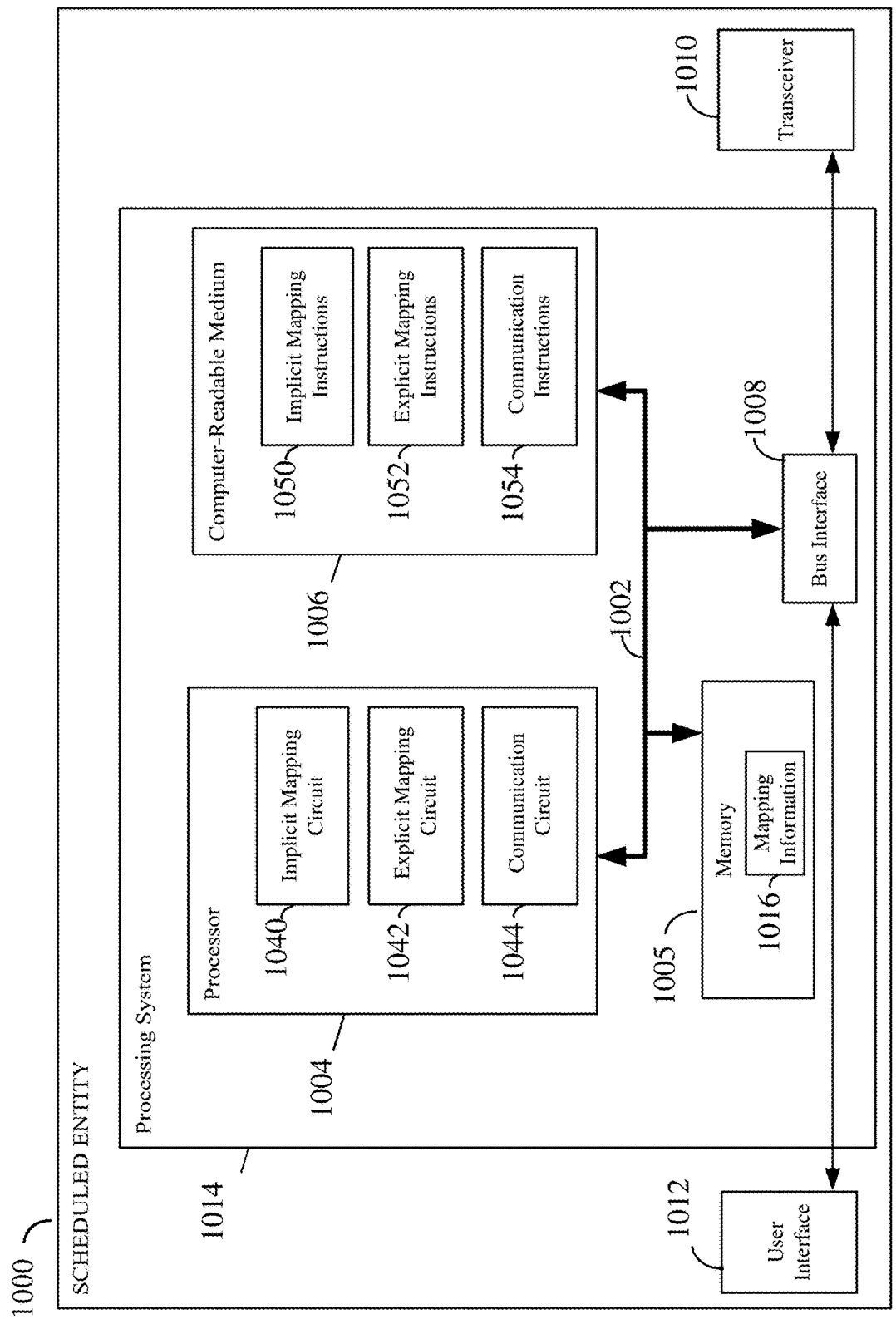
FIG. 10 is a block diagram conceptually illustrating an example of a hardware implementation for a scheduled entity according to some aspects of the disclosure.

FIG. 10 is a conceptual diagram illustrating an example of a hardware implementation for an exemplary scheduled entity 1000 employing a processing system 1014. In accordance with various aspects of the disclosure, an element, or any portion of an element, or any combination of elements may be implemented with a processing system 1014 that includes one or more processors 1004. For example, the scheduled entity 1000 may be a user equipment (UE) as illustrated in any one or more of FIGS. 1 and 2.

The processing system 1014 may be substantially the same as the processing system 914 illustrated in FIG. 9, including a bus interface 1008, a bus 1002, memory 1005, a processor 1004, and a computer-readable medium 1006. Furthermore, the scheduled entity 1000 may include a user interface 1012 and a transceiver 1010 substantially similar to those described above in FIG. 9. That is, the processor 1004, as utilized in a scheduled entity 1000, may be used to implement any one or more of the processes described below and illustrated in FIGS. 11-14.

In some aspects of the disclosure, the processor 1004 may include an implicit mapping circuit 1040 configured for various functions, including, for example, mapping an ACK to an UL resource based on one or more parameters. In this example, the scheduled entity 1000 may receive a DL transmission from a scheduling entity including a CCE having a CCE index 906. The scheduled entity 1000 may be configured to monitor, via the transceiver 1010 and processing system 1014, a specific one or more CORESETs of the DL transmission. In one example, a first parameter of the one or more parameters may correspond to an index of the one or more CORESETs being monitored by the scheduled entity 1000. For example, the scheduled entity 1000 may receive DL data contained within a CORESET from the DL transmission, wherein the data contains one or more CCEs 904 within the CORESET, indexed by the CORESET index.

The processing system 1014 may generate an ACK message in response to the received DL transmission, and the implicit mapping circuit 1040 may map the ACK message to a first UL resource corresponding to the CCE index 906 and the first parameter. In one example, the first parameter corresponds to an index of one or more CORESETs being monitored by the scheduled entity 1000. The implicit mapping circuit 1040 may use the index of the CORESET to determine a specific resource pool or a location in an UL channel to be used for transmitting the ACK message. Here, the mapping between the CORESET index and the UL resource pool may be known by both the scheduled entity 1000 and the scheduling entity. For example, mapping information 1016 including a between CORESET index values and an UL resource may communicated to the scheduled entity and stored in the memory 1005 such that the processing system 1014 may access the data.

Similarly, the transceiver 1010 may receive a mapping between one or more CCE index 906 values and one or more UL resources. The implicit mapping circuit 1040 may use the index of a CCE 904 in the received DL data to determine the first UL resource, where the first UL resource includes one or more REs or a location within the UL resource pool. The scheduled entity 1000 may transmit the ACK message utilizing the first UL resource via the transceiver 1010. The mapping information 1016 including a mapping between the CCE index 906 and the one or more REs within the specific resource pool may be known by both the scheduled entity 1000 and the scheduling entity and stored in respective memory units (e.g., memory 1005).

In one example implementation, the scheduled entity 1000 may receive a first DL transmission via the transceiver 1010, where the first DL transmission contains data associated with a CORESET that the scheduled entity 1000 is configured to monitor. The data contains a number of CCEs 904 that are indexed within the CORESET. Using an index of the CORESET, the implicit mapping circuit 1040 may determine an UL resource pool or partition of an UL channel that is mapped to the index of the CORESET. The implicit mapping circuit 1040 may also determine a first UL resource within the UL resource pool using an index of a CCE 904 that is mapped to the first UL resource. Again, the indexed CCE 904 may be contained within the CORESET, indexed by the CORESET index. The first UL resource may relate to a certain location and/or number of resource blocks or resource elements within the UL burst region 912. In this way, the scheduling entity may indicate to the scheduled entity 1000 the specific UL resource for ACK transmission via implicit signaling using the parameters specific to the scheduled entity 1000 (e.g., CORESET index and the CCE index contained within the indexed CORESET). The scheduled entity 1000 may then respond to the first DL transmission with the ACK message via the first UL transmission.

In certain implementations, the CORESET index and/or the CCE index may be interchangeable with other parameters. For example, the implicit mapping circuit 1040 may determine the first UL resource based on a known relationship between the first UL resource and a C-RNTI, and/or an SCID used for DMRS generation with MU-MIMO. In another example, the implicit mapping circuit 1040 may determine the UL resource jointly based on the CCE index 906 and/or the CORESET index, and one or more of the SCID and/or C-RNTI.

The scheduled entity 1000 may be configured to receive a look-up table or similar mapping information from the scheduling entity indicating implicit mapping between the first UL resource and any of the parameters associated with the scheduled entity 1000 and/or the first DL transmission. The memory information 1016 including the look-up table may be stored in the memory 1005. The implicit mapping circuit 1040 read and maintain the look-up table to perform any of the functions described herein.

In some aspects of the disclosure, the processor 1004 may include an explicit mapping circuit 1042 configured for various functions, including, for example, mapping UL resources to the UL channel. The explicit resource circuit 1042 may be configured to implement one or more of the functions described below in relation to FIGS. 11-14.

Collision of UL communications from different scheduled entities may be reduced or eliminated by distinguishing different scheduled entities 1000 using the implicit mapping based not only on parameters specific to the scheduled entity, but also based on an additional information elements. In one example, the explicit mapping circuit 1042 may utilize an explicit signal carried in a DCI in a DL transmission between a scheduling entity and a scheduled entity 1000 to determine an UL resource for communication. In another example, the explicit signal may be included in an ACK grant communicated by the scheduling entity to the scheduled entity 1000. The explicit signal may be any suitable number of bits, occupying any suitable number of resource blocks or resource elements in the DL transmission. In one example, the explicit signal may include a number of bits that indicate an amount of offset to be applied to a first UL resource determined via implicit mapping. Accordingly, the explicit mapping circuit 1042 may determine an amount of offset corresponding to the number of bits in the explicit signal. The scheduled entities 1000 may make the determination using mapping information 1016 that includes a look-up table stored in the memory 1005.

For example, the scheduling entity may communicate a two-bit explicit signal to the scheduled entity 1000 via transceiver on a DL transmission. The explicit mapping circuit 1042 may determine an amount of offset corresponding to the two-bit signal. The explicit mapping circuit 1042 may apply the amount of offset to a first UL resource, where the first UL resource was determined by implicit mapping. The explicit mapping circuit 1042 may determine the amount of offset by using the stored look-up table that maps the two-bit signal with a corresponding amount of offset. The first UL resource may have been previously determined through implicit mapping using parameters from a previous DL transmission. The explicit mapping circuit 1042 may then apply the determined amount of offset to the first UL resource to generate a second UL resource for transmitting the ACK message in response to the previous DL transmission.

In another implementation, the explicit signal may include an override command. For example, the explicit signal may be configured to override the implicit mapping to an UL resource by providing a parameter (e.g., an address or index) to another UL resource over which the scheduled entity 1000 may transmit an UL communication. The explicit mapping circuit 1042 may determine the override parameter and map an UL communication according to the explicit signal. In one example, the explicit signal for override may be communicated via the ACK grant.

The processor 1004 may further include communication circuitry 1044. The communication circuitry 1044 may include one or more hardware components that provide the physical structure that performs various processes related to wireless communication (e.g., signal reception, signal generation, and/or signal transmission) as described herein.

In one or more examples, the computer-readable storage medium 1006 may include software containing implicit mapping instructions 1052 configured for various functions, including, for example, receiving an implicit mapping arrangement from a scheduling entity, and mapping resources of the UL channel to certain parameters specific to the scheduled entity 1000 and/or parameters specific to a DL transmission received by the scheduled entity 1000. For example, the software containing implicit mapping instructions 1052 may be configured to implement one or more of the functions described below in relation to FIGS. 11-14.

In one or more examples, the computer-readable storage medium 1006 may include software containing explicit resource instructions 1054 configured for various functions, including, for example, receiving an explicit mapping to an UL resource for responding to a received DL transmission, and overriding an implicit mapping to another UL resource based on the explicit mapping. For example, the software containing explicit resource instructions 1054 may be configured to implement one or more of the functions described below in relation to FIGS. 11-14.

In one or more examples, the computer-readable medium 1006 may include communication instructions 1054. The communication instructions 1054 may include one or more software instructions that, when executed, provide the means to perform various processes related to wireless communication (e.g., signal reception, signal generation, and/or signal transmission) as described herein. In one configuration, the scheduled entity 1000 is an apparatus configured for wireless communication, and includes means for receiving a DL transmission including a CCE having a CCE index. In one aspect, the aforementioned means may include one or more of the transceiver 1010, the bus interface 1008, and the processing system 1014. In another aspect, the aforementioned means may be a circuit or any apparatus configured to perform the functions recited by the aforementioned means.

In another configuration, the scheduled entity 1000 includes means for generating an ACK for transmission in response to the DL transmission. In one aspect, the aforementioned means may be the processing system 1014. In another aspect, the aforementioned means may include the processor 1004 and corresponding implicit resource circuit 1040 and explicit resource circuit 1042. In another aspect, the aforementioned means may include the computer readable medium 1006 and the corresponding implicit resource instructions 1052 and explicit resource instructions 1054. In another aspect, the aforementioned means may be a circuit or any apparatus configured to perform the functions recited by the aforementioned means.

In another configuration, the scheduled entity 1000 includes means for mapping the ACK to a first UL resource corresponding to the CCE index and a first parameter. In one aspect, the aforementioned means may be the processing system 1014. In another aspect, the aforementioned means may include the processor 1004 and corresponding implicit resource circuit 1040 and explicit resource circuit 1042. In another aspect, the aforementioned means may include the computer readable medium 1006 and the corresponding implicit resource instructions 1052 and explicit resource instructions 1054. In another aspect, the aforementioned means may be a circuit or any apparatus configured to perform the functions recited by the aforementioned means.

In another configuration, the scheduled entity 1000 includes means for transmitting the ACK utilizing the first UL resource. In one aspect, the aforementioned means may include one or more of the transceiver 1010, the bus interface 1008, and the processing system 1014. In another aspect, the aforementioned means may be a circuit or any apparatus configured to perform the functions recited by the aforementioned means.

In another configuration, the scheduled entity 1000 includes means for receiving a first DL transmission including a CCE having a CCE index. In one aspect, the aforementioned means may include one or more of the transceiver 1010, the bus interface 1008, and the processing system 1014. In another aspect, the aforementioned means may be a circuit or any apparatus configured to perform the functions recited by the aforementioned means.

In another configuration, the scheduled entity 1000 includes means for mapping an ACK to a first UL resource corresponding to the CCE index and a first parameter in response to the first DL transmission. In one aspect, the aforementioned means may be the processing system 1014. In another aspect, the aforementioned means may include the processor 1004 and corresponding implicit resource circuit 1040 and explicit resource circuit 1042. In another aspect, the aforementioned means may include the computer readable medium 1006 and the corresponding implicit resource instructions 1052 and explicit resource instructions 1054. In another aspect, the aforementioned means may be a circuit or any apparatus configured to perform the functions recited by the aforementioned means.

In another configuration, the scheduled entity 1000 includes means for receiving an explicit signal indicative of a second UL resource. In one aspect, the aforementioned means may include one or more of the transceiver 1010, the bus interface 1008, and the processing system 1014. In another aspect, the aforementioned means may be a circuit or any apparatus configured to perform the functions recited by the aforementioned means.

In another configuration, the scheduled entity 1000 includes means for transmitting the ACK utilizing the second UL resource. In one aspect, the aforementioned means may include one or more of the transceiver 1010, the bus interface 1008, and the processing system 1014. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1, 2, 9 and/or 10, and utilizing, for example, the processes and/or algorithms described herein in relation to FIGS. 11-14.

Figure 11:
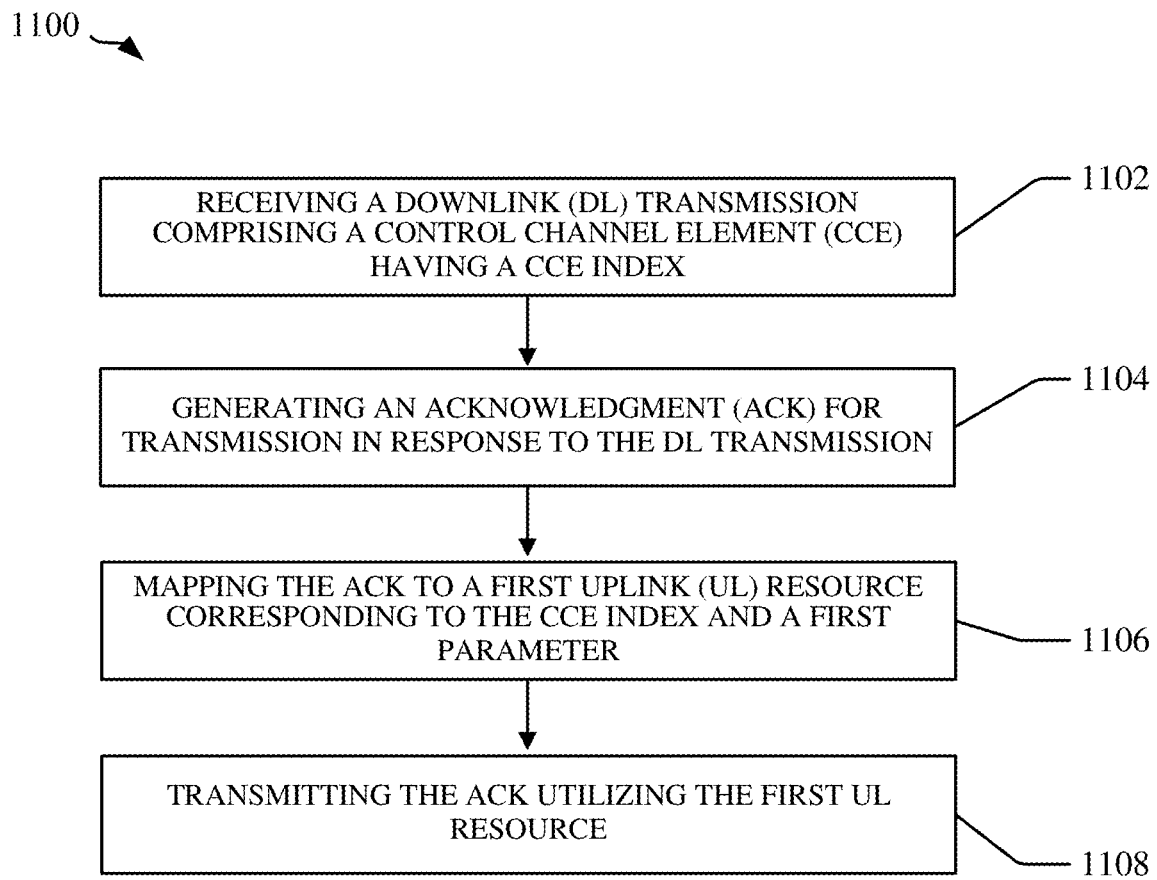
FIG. 11 is a flow diagram illustrating an example process for the implicit mapping of a communication to an uplink (UL) resource by a scheduled entity according to some aspects of the disclosure.

FIG. 11 is a flow diagram illustrating an example process for the implicit mapping of a communication to an UL resource by a scheduled entity, in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduled entity 1000 illustrated in FIG. 10. In some examples, the process 1100 may be carried out by any suitable apparatus or means for carrying out the functions or algorithm described below.

At block 1102, the scheduled entity 1000 may receive a DL transmission from a scheduling entity 900 via the transceiver 1010, where the DL transmission includes a CCE having a CCE index. The scheduled entity 1000 may be configured to monitor a specific one or more CORESETs of the DL transmission. Thus, the CCE and the corresponding CCE index may be contained within the CORESET portion of the DL transmission.

At block 1104, the scheduled entity 1000 may be configured to generate an ACK via the processor 1004, and in particular the communication circuit 1044 for transmission via the transceiver 1010 in response to the received DL transmission associated with the one or more CORESETs.

At block 1106, the scheduled entity 1000 may map the generated ACK to a first UL resource corresponding to the CCE index and a first parameter, using the stored mapping information 1016 in conjunction with the implicit mapping circuit 1040 and/or implicit mapping instructions 1050. In one example, the first parameter may correspond to an index of the one or more CORESETs being monitored by the scheduled entity 1000. The CCE index may correspond to a CCE within the one or more CORESETs.

In another example, the first parameter may correspond to parameter specific to the scheduled entity 1000, such as a radio network temporary identifier (RNTI) and an SCID, or other information element, communicated via DCI. In one embodiment, the RNTI and/or the SCID may include a known correspondence between an UL resource within a partitioned region of the UL channel. In another embodiment, the RNTI and/or the SCID may explicitly provide a specific location or address within the UL channel by which to map the ACK.

In another example, the scheduled entity may utilize one or more parameters specific to that scheduled entity 1000 in addition to utilizing the CORESET index. In this example, the CORESET index may map to a partition of UL resources while the one or more specific parameters may map to a specific location or number of resources within the partition of UL resources.

The first UL resource may correspond to a specific one or more resource elements in the UL channel, or to a first partitioned portion (i.e., first resource pool) of the UL channel. In one example, the scheduled entity 1000 may map the generated ACK to the first resource pool based on a known correspondence between the first parameter and the first resource pool. The scheduled entity may also map the generated ACK to a specific resource location or one or more resource elements within the first resource pool based on a known correspondence between the one or more resource elements and the CCE index. In an example where the first parameter is a CORESET index, the CCE index may be indexed by the CORESET index. In one example, the known correspondence may be a look-up table or any other data cataloging system stored with the mapping information 1016 in the memory 1005.

According to a further aspect of the present disclosure, the scheduled entity 1000 may receive a radio resource control (RRC) message including signaling indicative of the mapping between a CCE index and an UL burst region or UL channel for an ACK transmission. That is, an RRC information element may provide a table or index to map the CCE index to a location or address within the UL burst region. Additionally or alternatively, the RRC information element may provide information relating to an UL resource pool for the scheduled entity 1000 to utilize for ACK transmissions.

In some examples, a DCI associated with the DL transmission may include an information element configured to indicate an offset value for determining an amount of offset to be applied to an UL resource identified by implicit mapping. For example, the DCI may include a one or more bits indicative of the offset value. There may be a known correspondence between the offset value and an amount of offset applied to the implicit mapping. The known correspondence may be communicated to the scheduled entity 1000 by the scheduling entity 900, or vice versa. In one example, the known correspondence may be communicated via an RRC message, or any other suitable high layer messaging. The known correspondence maps the information element of the DCI to an amount of offset that the scheduled entity may apply to the implicit mapping to determine the offset UL resource to utilize for an ACK transmission.

In one example, the scheduled entity 1000 may receive a two-bit explicit signal from the scheduling entity 900 via a DL transmission. The scheduled entity 1000 utilize the mapping information 1016 along with the explicit mapping circuit 1042 and/or the explicit mapping instructions 1052 to determine an amount of offset to apply to a first UL resource. The scheduled entity 1000 may determine the amount of offset by using the look-up table stored in the mapping information 1016 that contains the known correspondence between the two-bit signal and the amount of offset to be applied to a first UL resource, where the first UL resource was determined by implicit mapping using one or more of a CORESET index and/or a CCE index, or another parameter disclosed herein. In one embodiment, the first UL resource may be determined using the implicit mapping of parameters in the same DL transmission that includes the two-bit explicit signal. In another embodiment, the two-bit explicit signal may be provided in a DL transmission that is communicated to the scheduled entity 1000 subsequent to the determination of the first UL resource by implicit mapping. The scheduled entity 1000 may then apply the determined amount of offset to the first UL resource to generate a second UL resource for transmitting an ACK in response to the previous DL transmission.

Using the two-bit explicit signal as an example, an associated look-up table may include four combinations of signaling that may each be mapped to an amount of offset. Table 1 is provided below to illustrate an example look-up table.

TABLE 1

| Explicit Signal | Offset Amount |
|---|---|
| 00 | 0RB |
| 01 | 10RB |
| 10 | 20RB |
| 11 | 30RB |

The two bits of the explicit signal may be represented as a number of RBs, REs, a resource location, or any other suitable resource mapping. Using an example of RBs, if the scheduled entity 1000 receives bits 01 from the scheduling entity 900, the scheduled entity 1000 will offset the first UL resource by 10 RB, or ten resource blocks. In another example, the two bits of the explicit signal may be represented as an offset in one or more of a frequency domain, a space domain, a time domain, a code domain, or a cyclic shift domain using any suitable dimensional units. In one example, the explicit signal may include a number of CCEs, where each CCE corresponds to one or more bits each having a corresponding offset amount.

At block 1108, the scheduled entity 1000 may generate an ACK via the communication circuit 1044 and/or the communication instructions 1054 to communicate to the scheduling entity 900 in response to the DL transmission and transmit the ACK utilizing the first UL resource. In some examples, the scheduled entity 1000 may communicate the ACK via the second UL resource as a result of offsetting the first UL resource.

Figure 12:
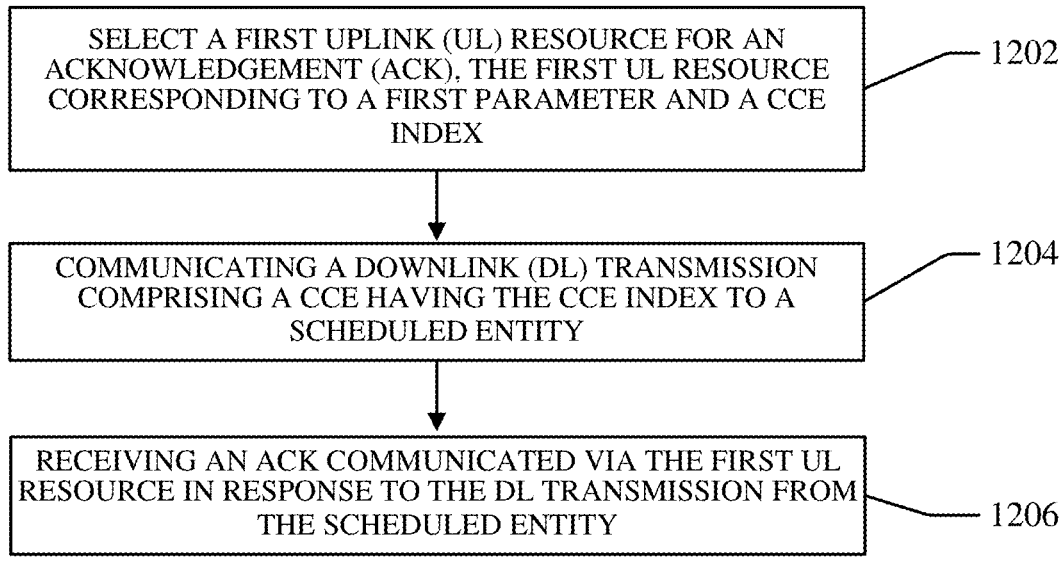
FIG. 12 is a flow diagram illustrating an example process for implicit mapping of a communication to an UL resource by a scheduling entity according to some aspects of the disclosure.

FIG. 12 is a flow chart illustrating an exemplary process 1200 for mapping an ACK to a resource of an UL channel by a scheduling entity 900, in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduling entity 900 illustrated in FIG. 9. In some examples, the process 1200 may be carried out by any suitable apparatus or means for carrying out the functions or algorithm described below.

At block 1202, using the implicit resource circuit 940 and/or the explicit resource circuit 942, and their corresponding instructions (950, 952), the scheduling entity 900 may select a first resource of an UL channel for communication of an ACK, where the first UL resource corresponds to a first parameter and a CCE index. For example, the scheduling entity 900 may generate the correspondence or mapping between the first UL resource and both the first parameter and the CCE index. The scheduling entity 900 may communicate the correspondence between the first UL resource and both the first parameter and the CCE index to a scheduled entity 1000 so that the correspondence is known to both entities. In another example, one or more of the first parameter or the CCE index may be mapped to a first partition, or resource pool of the UL channel. In some examples, the first parameter may include an index of one or more CORESETs being monitored by the scheduled entity 1000. In this example, the indexed CCE may be contained within a CORESET indexed by the CORESET index.

In one embodiment, the first parameter may correspond to a parameter specific to the scheduled entity 1000, such as an RNTI and an SCID communicated via DCI. The RNTI and the SCID may include a known correspondence between the first UL resource within the UL channel. In another embodiment, the scheduling entity 900 may generate a plurality of partitions or resource pools of bandwidth of the UL channel. The first UL resource may correspond to a first resource pool, or a first partitioned portion of the UL channel. The scheduling entity 900 may generate a correspondence between the first resource pool and the first parameter. The scheduling entity 900 may also generate a correspondence between the first UL resource and a CCE index. The correspondence between the first parameter and the first resource pool, and between the first UL resource and the CCE index, may be determined by the scheduling entity 900 and communicated to the scheduled entity 1000 so that the scheduled entity 1000 may identify the correspondence. In one example, the correspondence may be a look-up table or any other suitable data cataloging system.

A DCI associated with the DL transmission may include an information element configured to indicate an offset value for offsetting an UL resource determined by implicit mapping. In one example, the information element is the first parameter. In another example, the information element may include information in addition to the first parameter and the CCE index. In one example, the DCI may include one or more bits indicative of an offset value to be applied to the implicit mapping determined based on one or more of the CORESET index and the CCE index. There may be a known correspondence between the offset value and an amount of offset applied to the implicit mapping. In one example, the known correspondence may be communicated to the scheduled entity 1000 via a radio resource control RRC message, or any other suitable high layer messaging. The known correspondence maps the information element of the DCI to an amount of offset that the scheduled entity 1000 may apply to the implicit mapping.

The scheduling entity 900, using the explicit resource circuit 942 and/or explicit resource instructions 952, may configure the amount of offset that corresponds to a given explicit signal based on any suitable parameters. In one example, the scheduling entity 900 may transmit a look-up table containing a mapping between bits in the explicit signal and an amount of offset to be applied to the first UL resource. The look-up table may be communicated via the transceiver 910 between the scheduling entity 900 and the scheduled entity 1000 utilizing any higher layer communication protocol, such as RRC signaling. The scheduling entity 900 and the scheduled entity 1000 may maintain the look-up table in a respective memory portion on each device. In this way, there is a known relationship of a mapping between the number of bits in an explicit signal and an amount of offset to be applied to the first UL resource.

At block 1204, the scheduling entity 900 may communicate, via the transceiver 910, a DL transmission containing a CCE having a corresponding CCE index to the scheduled entity 1000 via a CORESET that the scheduled entity 1000 is configured to monitor. In one example, the communication may include an information element for offsetting a first UL resource determined by implicit mapping, to a second UL resource. For example, a two-bit explicit signal may be communicated to the scheduled entity 1000 in a DCI of the DL transmission. The two-bit signal is an example, however any suitable number of bits may be used in the explicit signal.

At block 1206, the scheduling entity 900 may receive an ACK communicated via the first UL resource in response to the DL transmission from the scheduled entity 1000. In some examples, the scheduling entity may receive the ACK communicated via the second UL resource as a result of offsetting the first UL resource.

In a further aspect of the disclosure, collision of UL ACK transmissions from different scheduled entities may be reduced or eliminated by distinguishing different scheduled entities using the implicit mapping based not only on parameters specific to each scheduled entity as described herein, but also based on an additional information.

Figure 13:
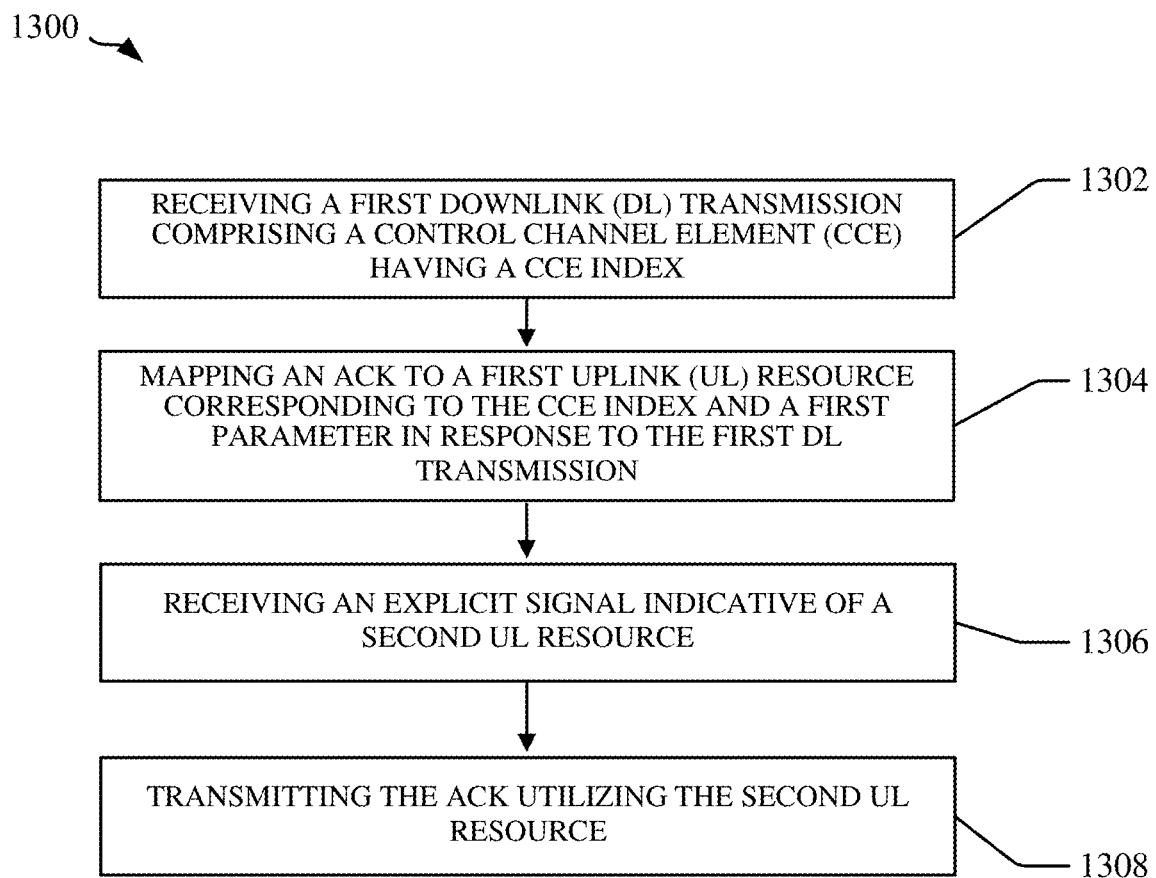
FIG. 13 is a flow diagram illustrating an example process for explicit mapping of a communication to an UL resource by a scheduled entity according to some aspects of the disclosure.

FIG. 13 is a flow chart illustrating an exemplary process 1300 for mapping an ACK to a resource of an UL channel by a scheduled entity 1000, in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduled entity 1000 illustrated in FIG. 10. In some examples, the process 1300 may be carried out by any suitable apparatus or means for carrying out the functions or algorithm described below.

At block 1302, the scheduled entity 1000 may receive a first DL transmission via the transceiver 1010, including a CCE having a CCE index. At block 1304, the scheduled entity may generate an ACK by the communication circuit 1044 and/or communication instructions 1054 and map the ACK to a first UL resource corresponding to the CCE index and a first parameter in response to the first DL transmission.

At block 1306, the scheduled entity 1000 may receive an explicit signal indicative of a second UL resource. In one example, the explicit signal may be carried in a DCI in a DL transmission between the scheduling entity 900 and the scheduled entity 1000. In another example, the explicit signal may be included in an ACK grant received by the scheduled entity 1000. The explicit signal may be any suitable number of bits, occupying any suitable number of resource blocks or resource elements in the DL transmission. In one example, the explicit signal may include a number of bits that indicate an amount of offset to be applied to the first UL resource determined via implicit mapping. Accordingly, the scheduled entity 1000 may receive the explicit signal from the scheduling entity 900, instructing the scheduled entity 1000 to apply an amount of offset corresponding to the number of bits in the explicit signal. The scheduled entity 1000 may receive the explicit signal and determine the amount of offset that corresponds to the number of bits using a stored look-up table in the mapping information 1016.

In another implementation, the explicit signal may include an override command. For example, the explicit signal may be configured to override the implicit mapping that indicated the first UL resource by providing an address or index to a second UL resource over which the scheduled entity 1000 may transmit an UL communication (e.g., an ACK) in response to the DL transmission.

At block 1208, the scheduled entity 1000 may transmit the ACK utilizing the second UL resource and the transceiver 1010.

Figure 14:
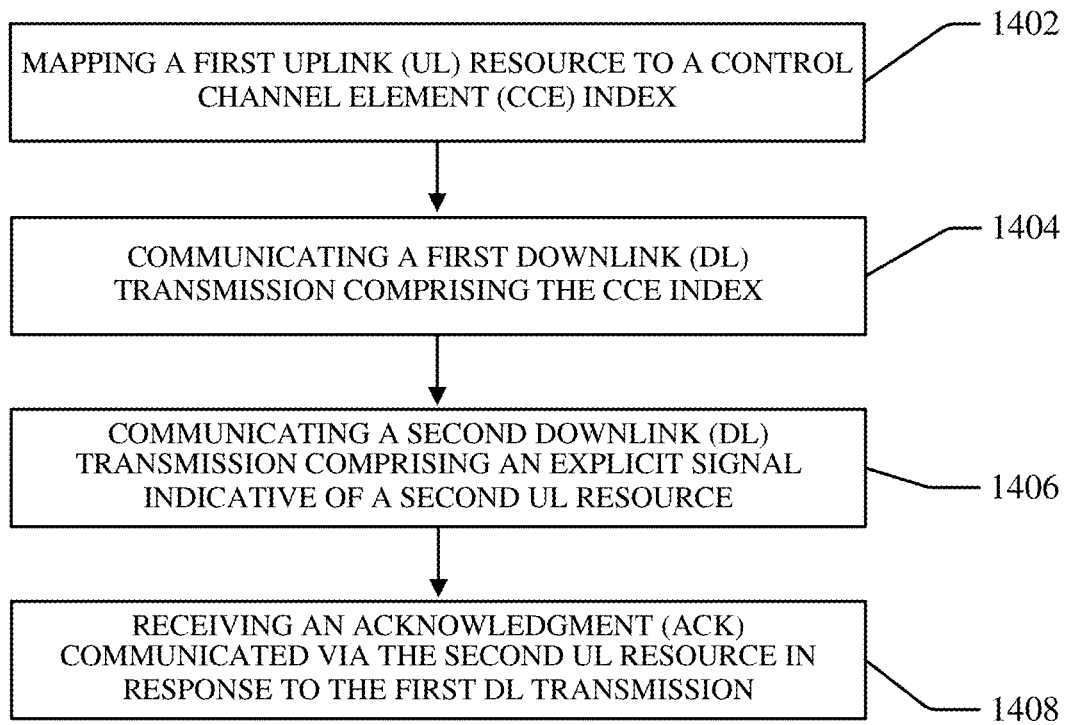
FIG. 14 is a flow diagram illustrating an example process for explicit mapping of a communication to an UL resource by a scheduling entity according to some aspects of the disclosure.

FIG. 14 is a flow chart illustrating an exemplary process 1400 for mapping an ACK to a resource of an UL channel by a scheduling entity 900, in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the scheduling entity 900 illustrated in FIG. 9. In some examples, the process 1400 may be carried out by any suitable apparatus or means for carrying out the functions or algorithm described below.

At block 1402, the scheduling entity 900 may map a first UL resource to a CCE index using one or more of the explicit resource circuit 942 and the explicit resource instructions 952. At block 1404, the scheduling entity 900 may communicate a first DL transmission containing the CCE index. At block 1406, the scheduling entity 900 may communicate a second DL transmission via the transceiver 910 containing an explicit signal indicative of a second UL resource. In one example, the explicit signal may be carried in a DCI in the DL transmission between the scheduling entity 900 and the scheduled entity 1000. In another example, the explicit signal may be included in an ACK grant communicated to the scheduled entity 1000. The explicit signal may be any suitable number of bits, occupying any suitable number of resource blocks or resource elements in the second DL transmission. In one example, the explicit signal may include a number of bits that indicate an amount of offset to be applied to the first UL resource determined via implicit mapping. The scheduling entity 900 may communicate the explicit signal to one or more scheduled entities 1000 instructing the scheduled entities 1000 to apply an amount of offset to the first UL resource, where the amount of offset corresponds to the number of bits in the explicit signal. In another implementation, the explicit signal may include an override command. For example, the explicit signal may be configured to override the implicit mapping to the first UL resource by providing an address or index to a second UL resource over which the scheduled entity 1000 may transmit an UL communication (e.g., an ACK) in response to the DL transmission.

At block 1308, the scheduling entity 900 may receive the ACK via the second UL resource in response to the first DL transmission.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 9, and 10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a scheduled entity, the method comprising:
 receiving a downlink (DL) transmission comprising a control channel element (CCE) having a CCE index;
 generating an acknowledgment (ACK) for transmission in response to the DL transmission;
 receiving signaling identifying a relationship between a first resource pool and a control resource set (CORESET) index of the DL transmission, and a relationship between a first uplink (UL) resource and the CCE index;
 mapping the ACK to the first UL resource corresponding to the CCE index and the CORESET index of the DL transmission; and
 transmitting the ACK utilizing the first UL resource;
 wherein an UL channel comprises the first resource pool corresponding to the CORESET index, and the first resource pool comprises the first UL resource corresponding to the CCE index, indexed by the CORESET index.

2. A method of wireless communication operable at a scheduled entity, the method comprising:
 receiving a downlink (DL) transmission comprising a control channel element (CCE) having a CCE index, and a DL control information (DCI) having an information element configured to indicate an offset value;
 generating an acknowledgment (ACK) for transmission in response to the DL transmission;
 mapping the ACK to a first uplink (UL) resource corresponding to the CCE index and applying the offset value to the first UL resource to generate a modified UL resource for transmitting the ACK;
 receiving another DL transmission comprising DL control information (DCI) having an information element indicative of a second UL resource, wherein the information element is configured to override the mapping of the ACK to the first UL resource; and
 transmitting the ACK utilizing the second UL resource.

3. The method of claim 2, further comprising:
 receiving a radio resource control (RRC) message mapping the information element to the offset value, wherein the offset value is configured to offset the first UL resource in one or more of a frequency domain, a code domain, a cyclic shift domain, or a time domain; and storing the information element and the offset value in a memory device.

4. The method of claim 2, wherein the other DL transmission comprises an ACK grant configured to provide one or more of an address or an index indicative of the second UL resource.

5. An apparatus configured for wireless communication, comprising:
a memory device;
a transceiver; and
at least one processor communicatively coupled to the memory device and the transceiver, configured to:
receive a downlink (DL) transmission comprising a control channel element (CCE) having a CCE index via the transceiver;
generate an acknowledgment (ACK) in response to the DL transmission;
receive signaling identifying a relationship between a first resource pool and a control resource set (CORESET) index of the DL transmission, and a relationship between a first uplink (UL) resource and the CCE index;
map the ACK to the first UL resource corresponding to the CCE index and the CORESET index of the DL transmission; and
transmit the ACK utilizing the first UL resource via the transceiver,
wherein an UL channel comprises a first resource pool corresponding to the CORESET index, and the first resource pool comprises the first UL resource corresponding to the CCE index, indexed by the CORESET index.

6. An apparatus configured for wireless communication, comprising:
a memory device;
a transceiver; and
at least one processor communicatively coupled to the memory device and the transceiver, configured to:
receive a downlink (DL) transmission comprising a control channel element (CCE) having a CCE index, and a DL control information (DCI) having a bit configured to indicate an offset value, via the transceiver;
generate an acknowledgment (ACK) in response to the DL transmission;
map the ACK to a first uplink (UL) resource corresponding to the CCE index and applying the offset value to the first UL resource to generate a modified UL resource for transmitting the ACK;
receive another DL transmission comprising DL control information (DCI) having an information element indicative of a second UL resource, wherein the information element is configured to override the mapping of the ACK to the first UL resource; and
transmit the ACK utilizing the second UL resource.

7. The apparatus of claim 6, wherein the at least one processor is further configured to:
receive a radio resource control (RRC) message mapping the bit to the offset value, wherein the offset value is configured to offset the first UL resource in one or more of a frequency domain, a code domain, a cyclic shift domain, or a time domain; and
store the bit and the offset value in the memory device.

8. The apparatus of claim 6, wherein the other DL transmission comprises an ACK grant configured to provide one or more of an address or an index indicative of the second UL resource.

9. A method of wireless communication operable at a scheduling entity, the method comprising:
selecting a first uplink (UL) resource for an acknowledgment (ACK), the first UL resource corresponding to a control resource set (CORESET) index of a CORESET of a downlink (DL) transmission and a CCE index;
communicating the DL transmission comprising a CCE having the CCE index to a scheduled entity;
mapping a first resource pool to the CORESET index, and mapping the first UL resource to the CCE index, indexed by the CORESET index;
communicating to the scheduled entity the mapping between the first resource pool and the CORESET index, and the mapping between the first UL resource and the CCE index; and
receiving the ACK communicated via the first UL resource in response to the DL transmission from the scheduled entity;
wherein an UL channel comprises a plurality of resource pools including the first resource pool comprising the first UL resource.

10. The method of claim 9, wherein each resource pool of the plurality of resource pools corresponds to a portion of a bandwidth of the UL channel.

11. The method of claim 9, wherein the CORESET comprises a first bandwidth that is sized based on an amount of bandwidth of the DL transmission that the scheduled entity can monitor.

12. The method of claim 9, wherein the UL resource is selected based on a number of scheduled entities in a cell.

13. A method of wireless communication operable at a scheduling entity, the method comprising:
selecting a first uplink (UL) resource for an acknowledgment (ACK), the first UL resource corresponding to a first parameter and a CCE index;
communicating a downlink (DL) transmission comprising a CCE having the CCE index to a scheduled entity;
communicating an UL resource override configured to override the first UL resource and explicitly assign a second UL resource; and
receiving the ACK communicated via the second UL resource in response to the DL transmission.

14. The method of claim 13, wherein the UL resource override is communicated via DL control information (DCI).

* * * * *